US012568482B2

(12) United States Patent
Luo et al.

(10) Patent No.: US 12,568,482 B2
(45) Date of Patent: Mar. 3, 2026

(54) PACKET DELAY BUDGET (PDB) AND TIME SENSITIVE COMMUNICATION (TSC) TRAFFIC IN INTEGRATED ACCESS AND BACKHAUL (IAB) NETWORKS

(71) Applicant: QUALCOMM Incorporated, San Diego, CA (US)

(72) Inventors: Jianghong Luo, Skillman, NJ (US); Karl Georg Hampel, Hoboken, NJ (US); Navid Abedini, Basking Ridge, NJ (US); Naeem Akl, Somerville, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/468,471

(22) Filed: Sep. 7, 2021

(65) Prior Publication Data

US 2022/0078808 A1    Mar. 10, 2022

Related U.S. Application Data

(60) Provisional application No. 63/075,788, filed on Sep. 8, 2020, provisional application No. 63/075,798, filed on Sep. 8, 2020, provisional application No. 63/075,764, filed on Sep. 8, 2020.

(51) Int. Cl.
*H04W 72/12* (2023.01)
*H04L 1/1812* (2023.01)
(Continued)

(52) U.S. Cl.
CPC ....... *H04W 72/1221* (2013.01); *H04L 1/1812* (2013.01); *H04L 47/283* (2013.01);
(Continued)

(58) Field of Classification Search
CPC ........... H04W 72/1221; H04W 72/542; H04W 28/0268; H04W 80/02; H04W 72/543;
(Continued)

(56) References Cited

U.S. PATENT DOCUMENTS

2011/0274053 A1* 11/2011 Baik ................... H04W 72/569
370/352
2020/0187040 A1    6/2020 Tsai et al.
(Continued)

FOREIGN PATENT DOCUMENTS

| CN | 111107634 A | 5/2020 |
| CN | 111294836 A | 6/2020 |
| WO | 2020029196 A1 | 2/2020 |

OTHER PUBLICATIONS

International Search Report and Written Opinion—PCT/US2021/049476—ISA/EPO—Feb. 14, 2022.
(Continued)

*Primary Examiner* — Mandish K Randhawa
(74) *Attorney, Agent, or Firm* — Patterson & Sheridan, L.L.P

(57) ABSTRACT

Aspects of the present disclosure may provide an apparatus, which may include a first node that may receive an indication of a one-hop radio link control (RLC) channel packet delay budget (PDB) for an RLC channel between the first node and a second node. The PDB is across a full protocol stack or a partial protocol stack. The first node may then schedule communications with the second node based on the one-hop RLC channel PDB. In some cases, an IAB node may report a capability of its stack processing time to an IAB donor node and/or a parent IAB node (directly or indirectly).

11 Claims, 24 Drawing Sheets

(51) Int. Cl.

| | |
|---|---|
| *H04L 47/283* | (2022.01) |
| *H04W 28/02* | (2009.01) |
| *H04W 72/542* | (2023.01) |
| *H04W 80/02* | (2009.01) |

(52) U.S. Cl.
CPC ..... *H04W 28/0268* (2013.01); *H04W 72/542* (2023.01); *H04W 80/02* (2013.01)

(58) Field of Classification Search
CPC ....... H04L 1/1812; H04L 47/283; H04L 1/18; H04B 7/15528
See application file for complete search history.

(56) References Cited

U.S. PATENT DOCUMENTS

| | | | | | |
|---|---|---|---|---|---|
| 2022/0338032 | A1* | 10/2022 | Hu | ........................ | H04W 24/04 |
| 2023/0164773 | A1* | 5/2023 | Alfarhan | ............... | H04W 72/52 |
| | | | | | 370/329 |
| 2023/0189045 | A1* | 6/2023 | Chen | ..................... | H04W 24/10 |
| | | | | | 370/252 |
| 2023/0199607 | A1* | 6/2023 | Adjakple | .............. | H04W 40/02 |
| | | | | | 370/310 |

OTHER PUBLICATIONS

Partial International Search Report—PCT/US2021/049476—ISA/EPO—Dec. 22, 2021.

Zte, et al., "Miscellaneous Enhancements for IAB Network", 3GPP Draft, R2-2007312, 3GPP TSG-RAN WG2 Meeting #111 electronic, 3rd Generation Partnership Project (3GPP), Mobile Competence Centre, 650, Route Des Lucioles, F-06921 Sophia-Antipolis Cedex, France, vol. RAN WG2, no. electronic, Aug. 17, 2020-Aug. 28, 2020, Aug. 7, 2020 (Aug. 7, 2020), XP051912080, 7 Pages, Retrieved from the Internet: URL:https://ftp.3gpp.org/tsg_ran/WG2_RL2/TSGR2_111-e/Docs/R2-2007312.zip R2-2007312 Miscellaneous enhancements for IAB network.doc [retrieved on Aug. 7, 2020] the Whole Document.

* cited by examiner

500
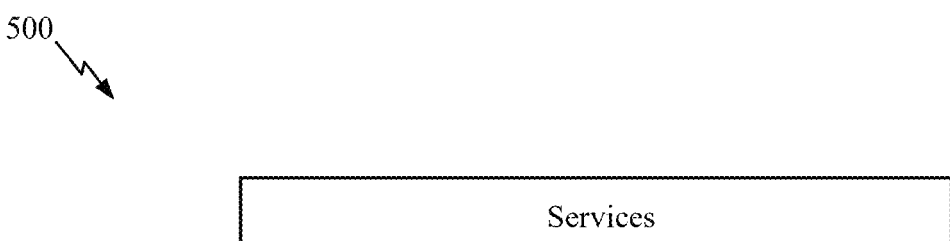
Services
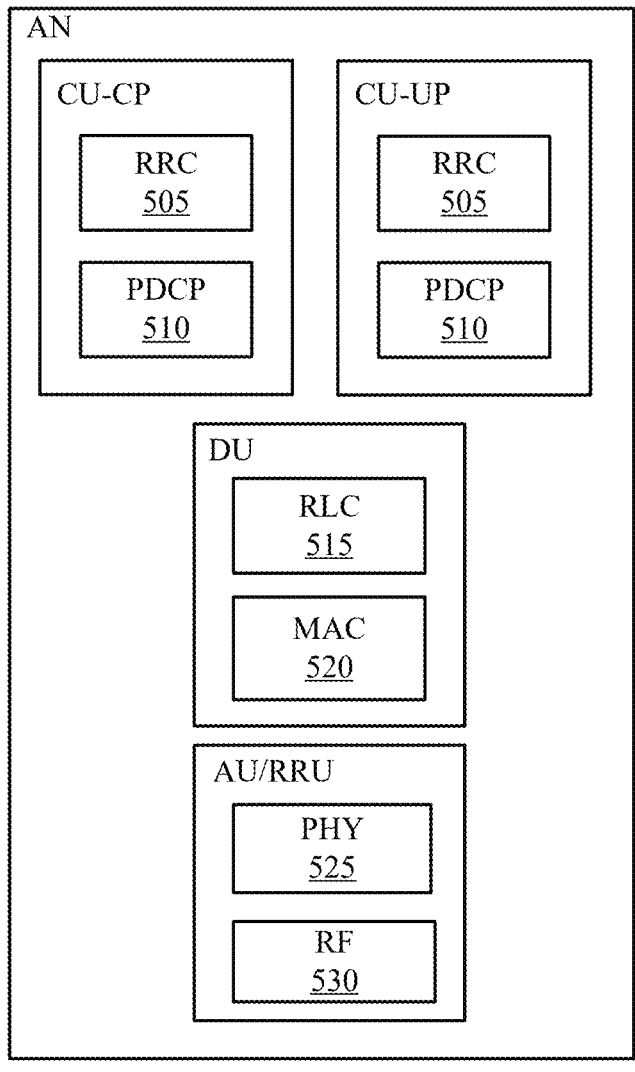
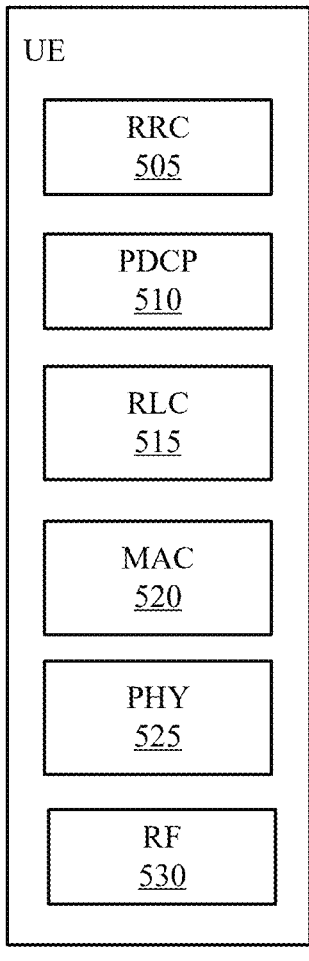
FIG. 5

600

1000

1002

Receive an indication of a one-hop radio link control (RLC) channel packet delay budget (PDB) for an RLC channel between a first node and a second node

1004

Schedule communications with the second node based on the RLC channel PDB

1100

1102

Determine a one-hop radio link control (RLC) channel packet delay budget (PDB) for an RLC channel between nodes where the PDB is across a full protocol stack or a partial protocol stack

1104

Configure a second node with the determined one-hop RLC channel PDB

1200

1202

Provide a stack processing time capability of a first node to a second node

1204

Receive scheduling for a radio link control (RLC) channel, a one-hop RLC channel packet delay budget (PDB) for an RLC channel, or both, from the second node

1300

1302

Receive a stack processing time capability of a second node

1304

Configure the second node with a one-hop radio link control (RLC) channel packet delay budget (PDB) for an RLC channel based on the stack processing time capability of the second node

1400

1402

Receive a stack processing time capability of a second node

1404

Schedule the second node for a radio link control (RLC) channel based on the stack processing time capability of the second node

1600

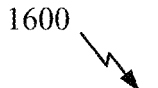

1602

OBTAIN, BY A FIRST NODE, ASSISTANCE INFORMATION FOR DETERMINING ONE OR MORE ONE-HOP RADIO LINK CONTROL (RLC) CHANNEL PACKET DELAY BUDGETS (PDBS) FOR ONE OR MORE OTHER NODES

1604

DETERMINE, BY THE FIRST NODE, THE ONE OR MORE ONE-HOP RLC CHANNEL PDBS FOR THE ONE OR MORE OTHER NODES BASED, AT LEAST IN PART, ON THE ASSISTANCE INFORMATION

1606

CONFIGURE, BY THE FIRST NODE, THE ONE OR MORE OTHER NODES WITH THE DETERMINED ONE OR MORE ONE-HOP RLC CHANNEL PDBS

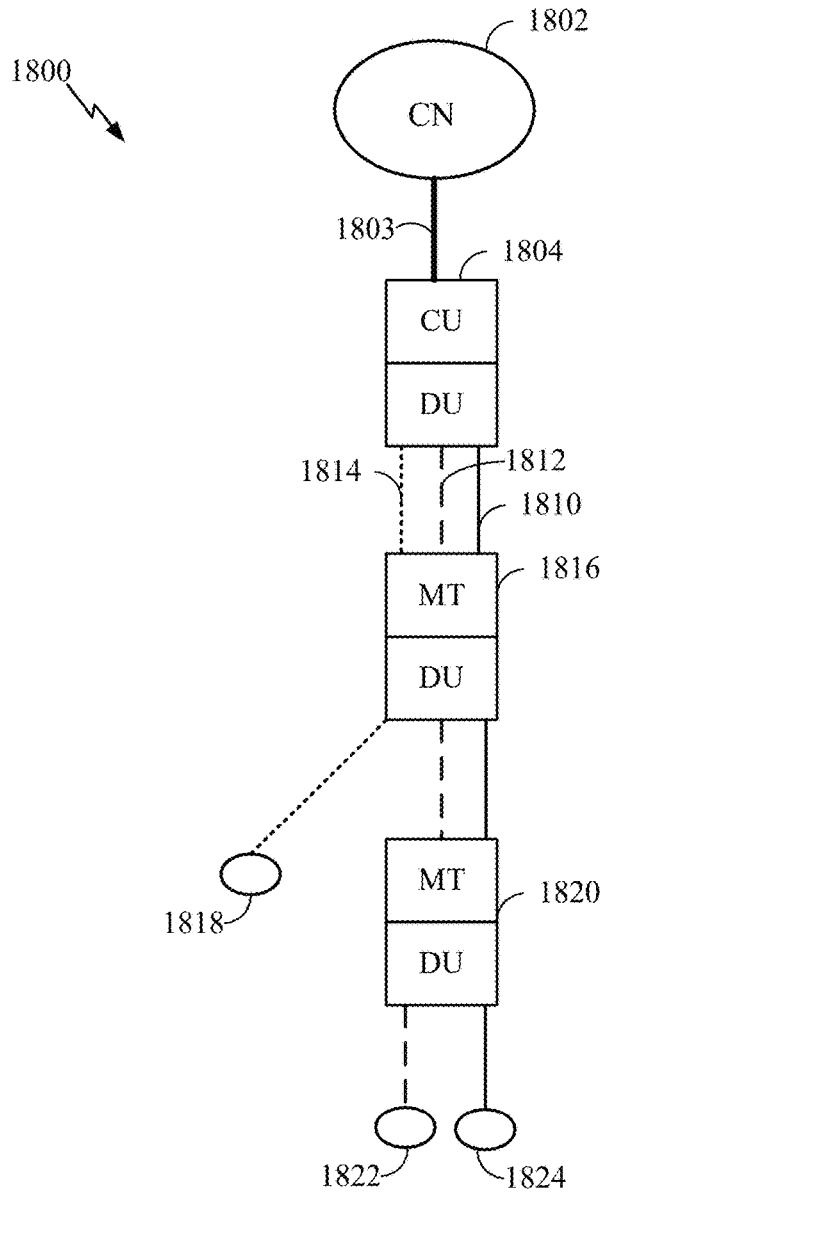
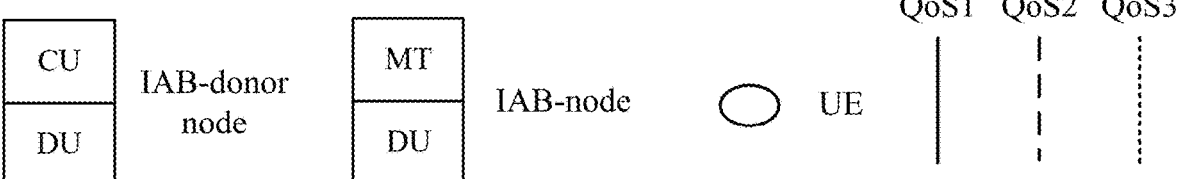
FIG. 18

2000

2002

RECEIVE, BY A FIRST NODE, ASSISTANCE INFORMATION, FROM A SECOND NODE, ASSOCIATED WITH A TIME SENSITIVE COMMUNICATIONS (TSC) FLOW

2004

SCHEDULE, BY THE FIRST NODE, TSC TRAFFIC OVER A RADIO LINK CONTROL (RLC) CHANNEL BETWEEN THE FIRST NODE AND A THIRD NODE BASED, AT LEAST IN PART, ON THE ASSISTANCE INFORMATION

2100

2102

DETERMINE, BY A FIRST NODE, ASSISTANCE INFORMATION
ASSOCIATED WITH A TIME SENSITIVE COMMUNICATIONS (TSC)
FLOW

2104

PROVIDE, BY THE FIRST NODE, THE ASSISTANCE INFORMATION TO A
SECOND NODE

PACKET DELAY BUDGET (PDB) AND TIME SENSITIVE COMMUNICATION (TSC) TRAFFIC IN INTEGRATED ACCESS AND BACKHAUL (IAB) NETWORKS

CROSS-REFERENCE TO RELATED APPLICATIONS

This application claims benefit to U.S. Provisional Patent Application Ser. No. 63/075,764, entitled "PDB Enhancements for an RLC Channel in an IAB Network," and filed Sep. 8, 2020; U.S. Provisional Patent Application Ser. No. 63/075,788, entitled "Assistance Information for PDB Determination in IAB Networks," and filed Sep. 8, 2020; and U.S. Provisional Patent Application Ser. No. 63/075,798, entitled "Signaling Enhancements for Supporting Time Sensitive Communication (TSC) Traffic in an Integrated Access and Backhaul (IAB) Network," and filed Sep. 8, 2020; each of which is assigned to the assignee hereof, and each of which is hereby incorporated by reference in its entirety.

BACKGROUND

Field of the Disclosure

Aspects of the present disclosure relate to wireless communications, and more particularly, to techniques for packet delay budget (PDB) enhancements for a radio link control (RLC) channel between two nodes in an integrated access and backhaul (IAB) network. Aspects of the present disclosure further relate to techniques for signaling enhancements for an IAB node to report its stack processing time capability to an IAB donor node or a parent IAB node of the IAB node.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using the OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved packet delay budget (PDB) determination for a radio link control (RLC) channel between two nodes in an integrated access and backhaul (IAB) network.

Certain aspects of the subject matter described in this disclosure can be implemented in a method for wireless communication by a first node. The method generally includes receiving an indication of a one-hop RLC channel PDB for an RLC channel between the first node and a second node where the PDB is across a full protocol stack or a partial protocol stack. The method generally includes scheduling communications with the second node based on the RLC channel PDB.

Certain aspects of the subject matter described in this disclosure can be implemented in a method for wireless communication by a first node. The method generally includes determining a one-hop RLC channel PDB for an RLC channel between nodes where the PDB is across a full protocol stack or a partial protocol stack. The method generally includes configuring a second node with the determined RLC channel PDB.

Certain aspects of the subject matter described in this disclosure can be implemented in a method for wireless communication by a first node. The method generally includes providing a stack processing time capability of the first node to a second node. The method generally includes receiving scheduling for a RLC channel, a one-hop RLC channel PDB for an RLC channel, or both, from the second node.

Certain aspects of the subject matter described in this disclosure can be implemented in a method for wireless communication by a first node. The method generally includes receiving a stack processing time capability of a second node. The method generally includes configuring the second node with a one-hop RLC channel PDB for an RLC channel, based on the stack processing time capability of the second node.

Certain aspects of the subject matter described in this disclosure can be implemented in a method for wireless communication by a first node. The method generally includes receiving a stack processing time capability of a second node. The method generally includes scheduling the second node for a RLC channel based on the stack processing time capability of the second node.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 is a block diagram showing examples for implementing a communication protocol stack in the example RAN architecture, in accordance with certain aspects of the present disclosure.

FIG. 16 is a flow diagram illustrating example operations for wireless communication by a first node, in accordance with certain aspects of the present disclosure.

FIG. 18 illustrates an example IAB network with time sensitive communications (TSC) traffic, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
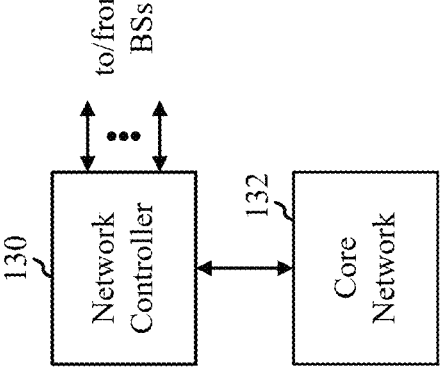
FIG. 1 is a block diagram conceptually illustrating an example wireless communication network, in accordance with certain aspects of the present disclosure.

Aspects of the present disclosure provide apparatus, methods, processing systems, and computer readable mediums for packet delay budget (PDB) determination and enhancements for a backhaul (BH) radio link control (RLC) channel between two nodes across a full protocol stack or a partial protocol stack in an integrated access and backhaul (IAB) network.

In certain IAB systems, a central unit (CU) of an IAB donor node may determine a one-hop radio link control (RLC) channel PDB between IAB nodes in the IAB network. The IAB nodes may include a first IAB node. The IAB nodes may further include a second IAB node, which is a child of the first IAB node. The IAB donor node may define the PDB between the IAB nodes as a delay upper bound of a packet across a full protocol stack or a partial protocol stack of a BH RLC channel between a distributed unit (DU) of the first IAB node and a mobile terminal (MT) of the second IAB node.

Aspects of the present disclosure provide apparatus, methods, processing systems, and computer readable mediums for signaling enhancements for an IAB node to report a capability of its stack processing time to an IAB donor node or a parent IAB node of the IAB node.

In certain IAB systems, an IAB donor node may receive a capability of a stack processing time of an IAB node from the IAB node. When the stack processing time of the IAB node is comparable with over-the-air transmission time, the IAB donor node may use the stack processing time of the IAB node to determine a one-hop RLC channel PDB for a BH RLC channel in the IAB network.

In certain IAB systems, a parent IAB node may receive the capability of the stack processing time of the IAB node from the IAB node. The parent IAB node may use the stack processing time of the IAB node for scheduling optimization. For instance, the parent IAB node may use the stack processing time of the IAB node to determine over-the-air latency bounds from a one-hop RLC channel PDB as indicated by an IAB donor node, and then make scheduling decisions over its child nodes and links based on determined over-the-air latency bounds.

The following description provides examples of PDB determination for a RLC channel between two nodes and signaling enhancements for an IAB node to report its stack processing time capability in an IAB network, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in a downlink (DL) may support up to 8 transmit antennas with multi-layer DL transmissions up to 8 streams and up to 2 streams per user equipment (UE). Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may be a NR or 5G network. The wireless communication network 100 may be in communication with a core network (CN) 132. The CN 132 may be in communication with one or more base station (BSs) 110a-z (each also individually referred to herein as BS 110 or collectively as BSs 110) and/or one or more UEs 120a-y (each also individually referred to herein as UE 120 or collectively as UEs 120) in the wireless communication network 100 via one or more interfaces.

According to certain aspects, the BSs 110 and the UEs 120 may be configured for communication in an IAB network. The BS 110a may function as an IAB donor node, with a connection to the CN 132. The BS 110a may function as an intermediate IAB node (e.g., a parent IAB node and/or a child IAB node). As shown in FIG. 1, the BS 110a includes a PDB manager 112 that may be configured for PDB determination for a RLC channel between two nodes and signaling for an IAB node to report its stack processing time capability in an IAB network, in accordance with aspects of the present disclosure. The UE 120a includes a PDB manager 122 that may be configured for the PDB determination for the RLC channel between the two nodes and the signaling for the IAB node to report its stack processing time capability in the IAB network, in accordance with aspects of the present disclosure.

The BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in the wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between devices.

A network controller 130 may be in communication with a set of BSs 110 and provide coordination and control for these BSs 110 (e.g., via a backhaul). In aspects, the network controller 130 may be in communication with the CN 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
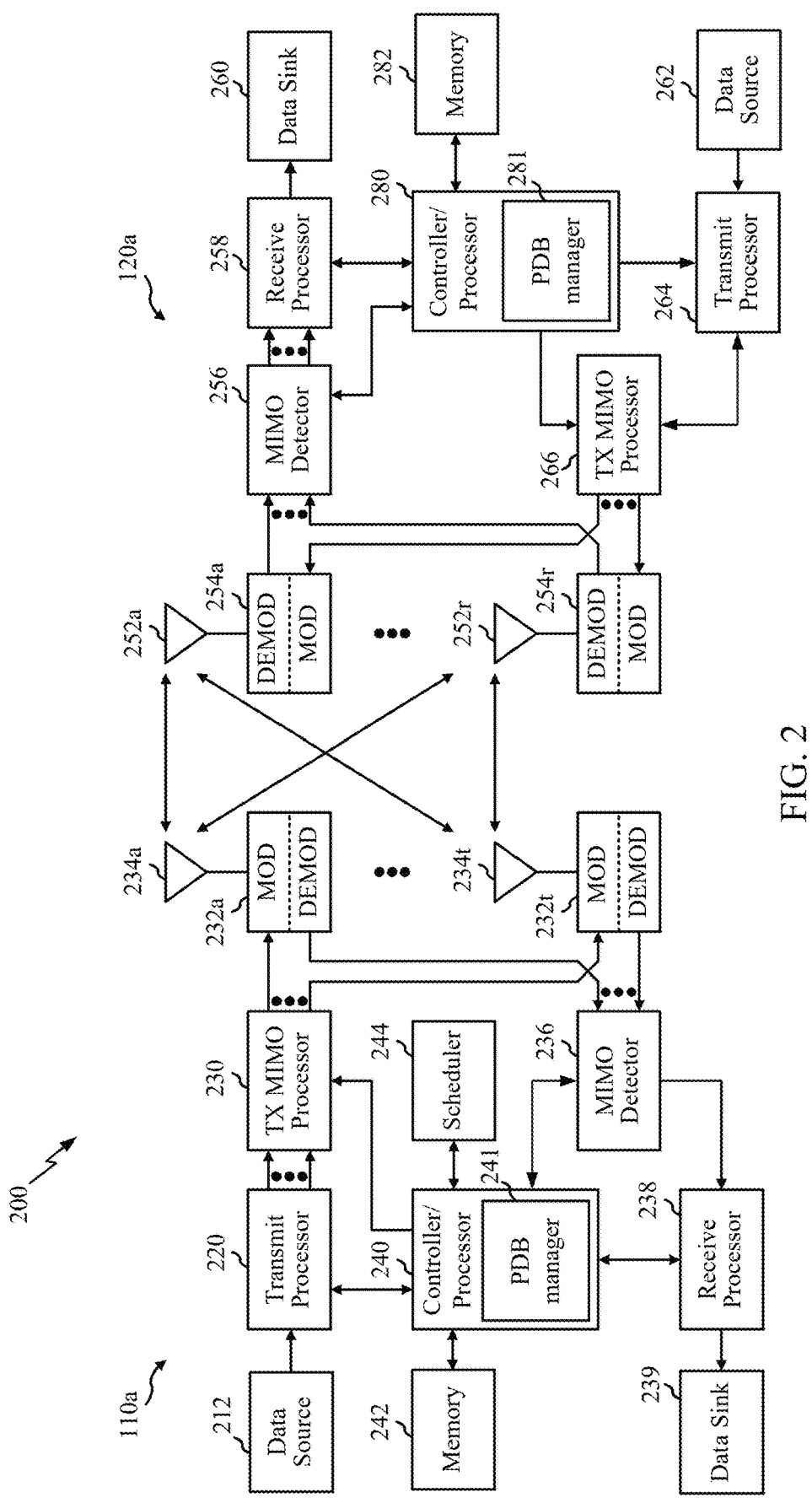
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PDB manager 241 that may be configured for PDB determination for a RLC channel between two nodes and signaling for an IAB node to report its stack processing time capability in an IAB network, according to aspects described herein. As shown in FIG. 2, the controller/processor 280 of the UE 120a has a PDB manager 281 that may be configured for the PDB determination for the RLC channel between the two nodes and the signaling for the IAB node to report its stack processing time capability in the IAB network, according to aspects described herein. Although shown at the controller/processor, other components of the UE 120a and the BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
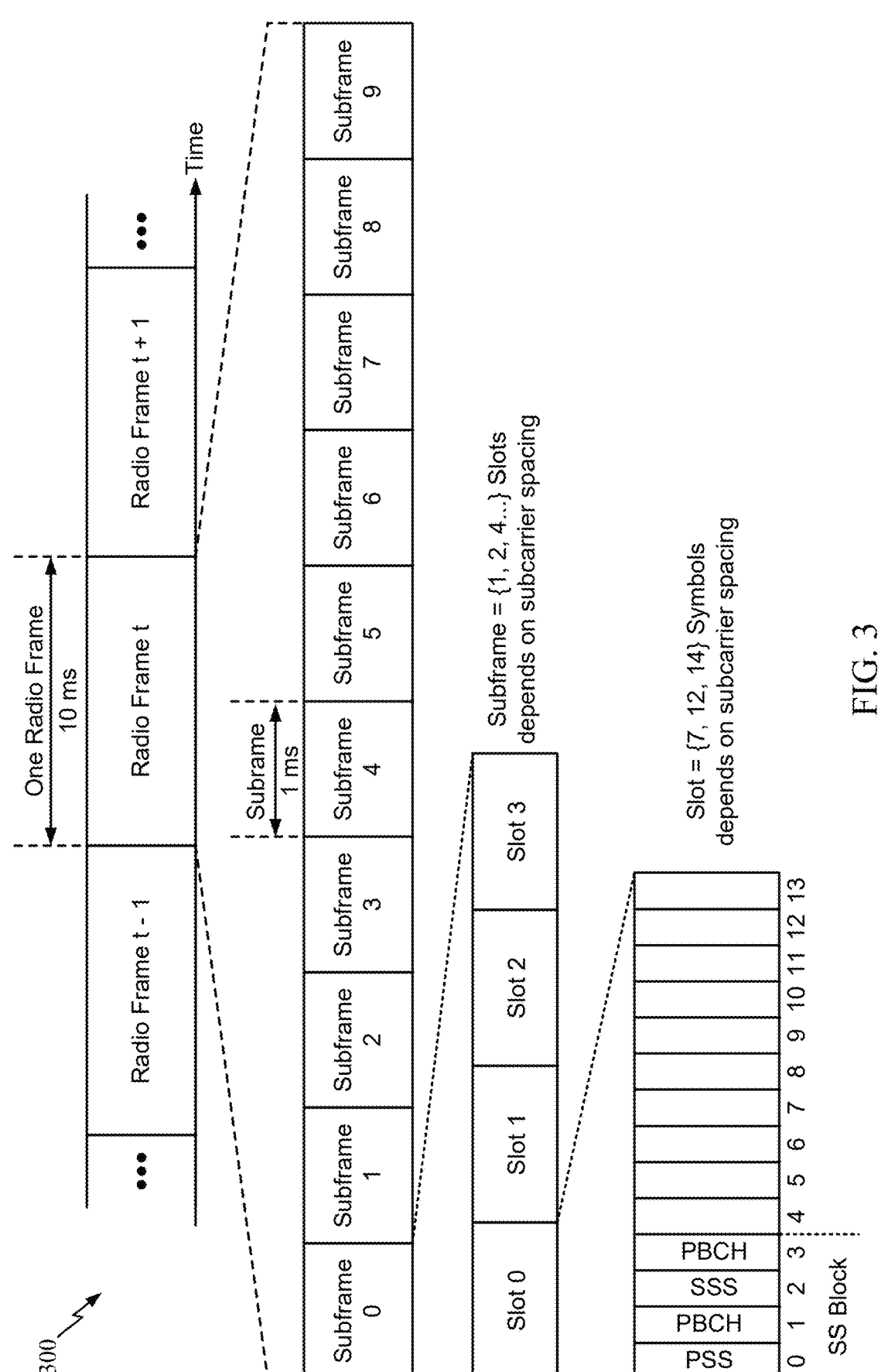
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
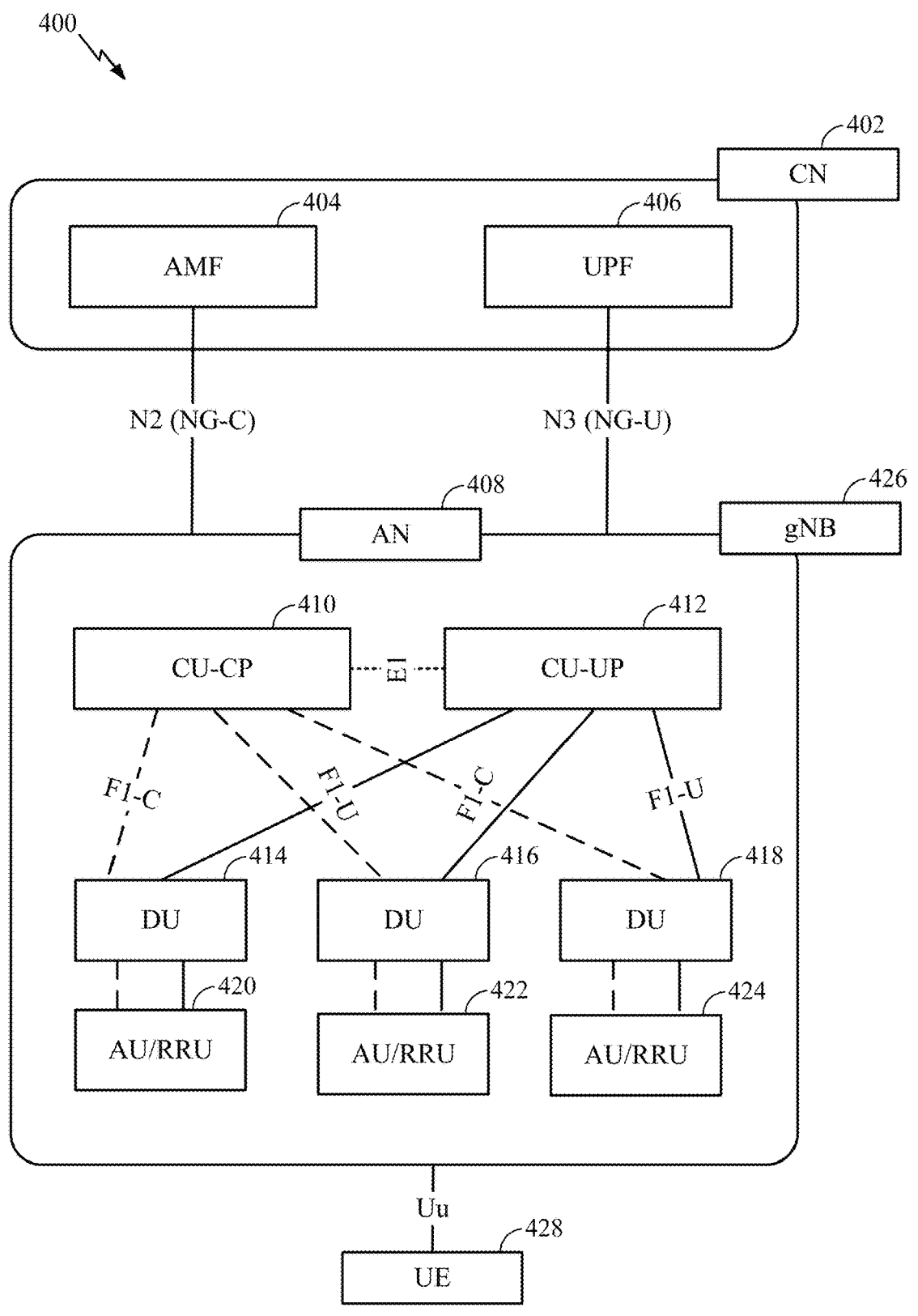
FIG. 4 is a block diagram illustrating an example architecture of a distributed radio access network (RAN), in accordance with certain aspects of the present disclosure.

FIG. 4 illustrates an example architecture of a distributed radio access network (RAN) 400, which may be implemented in the wireless communication network 100 illustrated in FIG. 1. As shown in FIG. 4, the distributed RAN 400 includes CN 402 and access node 408.

The CN 402 may host core network functions. CN 402 may be centrally deployed. CN 402 functionality may be offloaded (e.g., to advanced wireless services (AWS)), in an effort to handle peak capacity. The CN 402 may include the Access and Mobility Management Function (AMF) 404 and User Plane Function (UPF) 406. The AMF 404 and UPF 406 may perform one or more of the core network functions.

The AN 408 may communicate with the CN 402 (e.g., via a backhaul interface). The AN 408 may communicate with the AMF 404 via an N2 (e.g., NG-C) interface. The AN 408 may communicate with the UPF 406 via an N3 (e.g., NG-U) interface. The AN 408 may include a central unit-control plane (CU-CP) 410, one or more central unit-user plane (CU-UPs) 412, one or more distributed units (DUs) 414-418, and one or more Antenna/Remote Radio Units (AU/RRUs) 420-424. The CUs and DUs may also be referred to as gNB-CU and gNB-DU, respectively. One or more components of the AN 408 may be implemented in a gNB 426. The AN 408 may communicate with one or more neighboring gNBs.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the AN 408 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-CP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP.

A DU, such as DUs 414, 416, and/or 418, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of AU/RRUs 420-424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using Bearer Context Management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, AN 408 may support dual connectivity with NR and may share a common fronthaul for LTE and NR. The distributed RAN 400 may enable cooperation between and among DUs 414-418, for example, via the CU-CP 410. An inter-DU interface may not be used.

As shown in FIG. 4, the AN 408 may be in communication with one or more UEs (UE 428). For example, the AN 408 may be in communication with the UE(s) via one or more wireless access links (e.g., uU cellular interface).

Logical functions may be dynamically distributed in the distributed RAN 400. As will be described in more detail with reference to FIG. 5, the Radio Resource Control (RRC)

layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

FIG. 5 illustrates a diagram showing examples for implementing a communications protocol stack 500 in a RAN (e.g., such as the RAN 400), according to aspects of the present disclosure. The illustrated communications protocol stack 500 may be implemented by devices operating in a wireless communication system, such as a 5G NR system (e.g., the wireless communication network 100). In various examples, the layers of the protocol stack 500 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 5, the system may support various services over one or more protocols. One or more protocol layers of the protocol stack 500 may be implemented by the AN and/or the UE.

As shown in FIG. 5, the protocol stack 500 is split in the AN (e.g., AN 408 in FIG. 4). The RRC layer 505, PDCP layer 510, RLC layer 515, MAC layer 520, PHY layer 525, and RF layer 530 may be implemented by the AN. For example, the CU-CP (e.g., CU-CP 410 in FIG. 4) and the CU-UP e.g., CU-UP 412 in FIG. 4) each may implement the RRC layer 505 and the PDCP layer 510. A DU (e.g., DUs 414-418 in FIG. 4) may implement the RLC layer 515 and MAC layer 520. The AU/RRU (e.g., AU/RRUs 420-424 in FIG. 4) may implement the PHY layer(s) 525 and the RF layer(s) 530. The PHY layers 525 may include a high PHY layer and a low PHY layer.

The UE may implement the entire protocol stack 500 (e.g., the RRC layer 505, the PDCP layer 510, the RLC layer 515, the MAC layer 520, the PHY layer(s) 525, and the RF layer(s) 530).

Example IAB Network

As discussed above, aspects of the present disclosure related to IAB networks.

Traditional (for example, 3G, 4G, LTE) RAN may include multiple BS (for example, access nodes (AN)), where each BS communicates with a CN via a wired backhaul link, such as a fiber connection. A BS may communicate with a UE via an access link, which may be a wireless link.

In some systems, a RAN may include a wireless backhaul network. In some aspects or scenarios, a wireless backhaul network may sometimes be referred to as an IAB network With the exponential rise in data-demand far exceeding the capacity of the traditional macro-only cellular network operating in sub-6 GHz bands, network densification using mmWave base stations (BSs) is becoming a major driving technology for the 5G wireless evolution. With recent advancement in mm Wave communication with highly directional beamforming, it is possible to replace fibers for small BSs by establishing fixed mmWave wireless backhaul links between a small BS and a corresponding macro BS equipped with a fiber backhaul, also known as the anchored BS, thereby achieving Gigabits per second (Gbps) range data-rate over the backhaul links.

The IAB network can use 5G mmWave communication to support an access network including access links between ANs and UEs, as well as a backhaul network including wireless backhaul links between ANs of the IAB network. In a typical IAB, network resources (e.g., time and/or frequency resources) are shared between the access and backhaul networks/links.

The IAB network may include multiple BSs. The BSs may be of differing types or have differing operational characteristics. For example, in some aspects, an IAB network may have at least one BS that is an anchor BS. The anchor BS may communicate with a CN via a wired backhaul link, such as a fiber connection. An anchor BS may also be referred to as an IAB donor node.

The IAB network may also include one or more non-anchor BSs. Non-anchor BSs may be referred to as relay base stations, IAB nodes, or intermediate nodes. The non-anchor BSs may communicate directly with or indirectly with (for example, via one or more other non-anchor BSs 345) the anchor BSs via one or more backhaul links to form a backhaul path to the CN for carrying backhaul traffic. The backhaul link, or backhaul channel may be a wireless link. For example, the backhaul link may be an over-the-air radio link control (RLC) channel. Anchor BS(s) or non-anchor BS(s) may communicate with one or more UEs via access links, which may be wireless links for carrying access traffic. In some aspects, an anchor BS or a non-anchor BS may correspond to a BS 110 shown in FIG. 1. Similarly, a UE may correspond to a UE 120 shown in FIG. 1.

An IAB network may utilize a variety of differing radio frequency bands. According to some aspects, millimeter wave technology or directional communications can be utilized (for example, beamforming, precoding) for communications between BSs or UEs (for example, between two BSs, between two UEs, or between a BS and a UE). Wireless backhaul links between BSs may use millimeter waves to carry information or may be directed toward a target BS using beamforming, precoding. The wireless access links between a UE and a BS may use millimeter waves or may be directed toward a target wireless node (for example, a UE or a base station). In this way, inter-link interference may be reduced.

In some aspects, an IAB network may support a multi-hop network or a multi-hop wireless backhaul. Each node of an IAB network may use the same radio access technology (for example, 5G/NR). Nodes of an IAB network may share resources for access links and backhaul links, such as time resources, frequency resources, spatial resources. Various architectures of IAB nodes or IAB donors may be supported.

In some aspects, an IAB donor may include a central unit (CU) that configures IAB nodes that access a CN via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with a BS 110 for that IAB node, and an MT of an IAB node may perform functions described in connection with a UE 120 for that IAB node.

Figure 6:
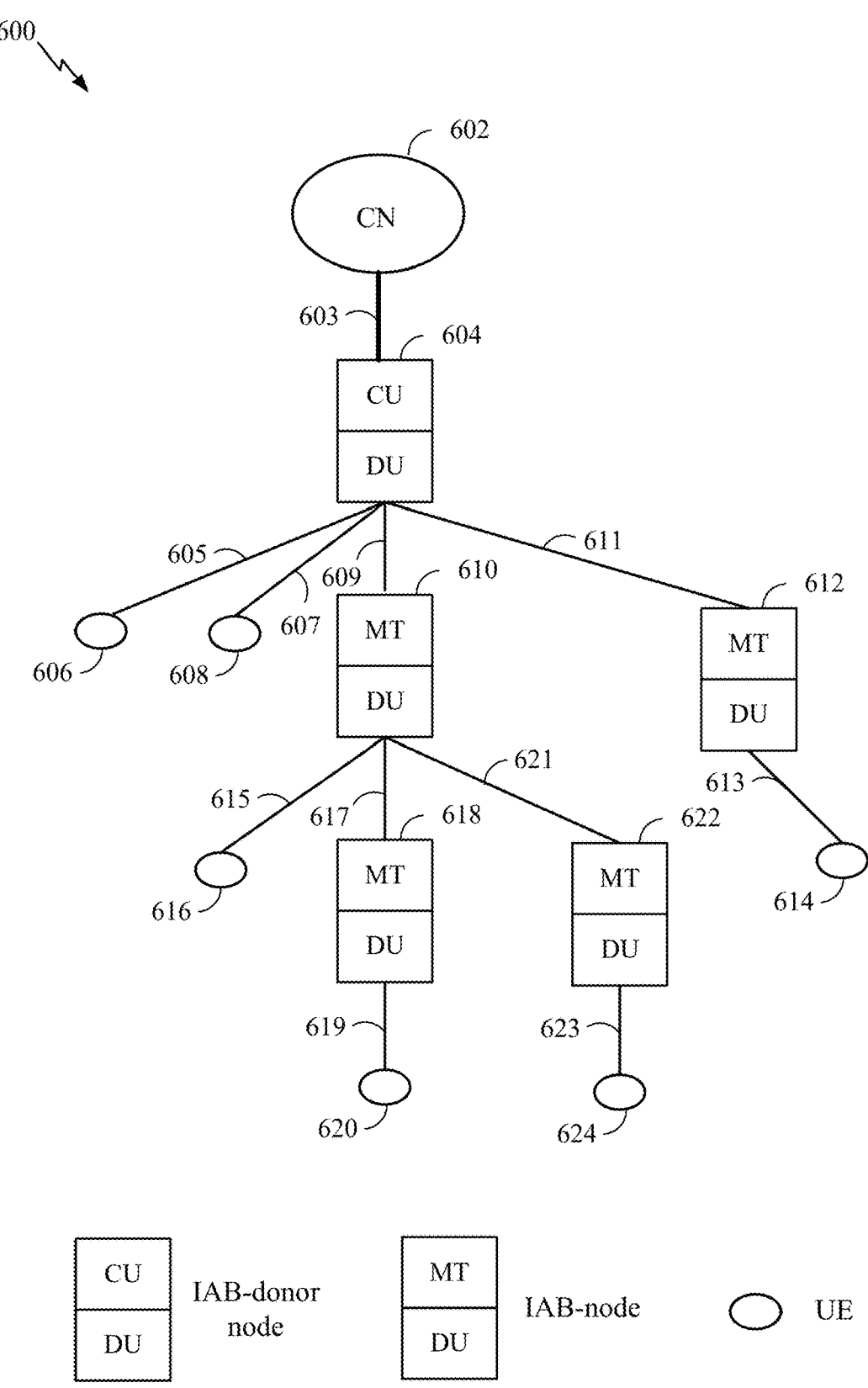
FIG. 6 is a diagram illustrating an example of an integrated access and backhaul (IAB) network architecture, in accordance with various aspects of the disclosure.

FIG. 6 is a diagram illustrating an example of an IAB network architecture 600, in accordance with various aspects of the disclosure. As shown in FIG. 6, an IAB network may include an IAB donor node 604 that connects to a core network 602 via a wired connection 603 (for example, as a wireline fiber). For example, an Ng interface of an IAB donor node 604 may terminate at the CN 602. IAB donor node 604 may connect to one or more devices of the CN 602 that provide a core access and mobility management function (AMF). In some aspects, IAB donor node 604 may include a BS 110, such as an anchor BS, as described above. As shown, IAB donor node 604 may include a CU, which may perform ANC functions or AMF functions. The CU may configure a DU of the IAB donor node 604. The CU may configure one or more IAB nodes (for example, an MT or a DU of IAB node 610 and 612) that connect to the CN 602 via the IAB donor node 604 (e.g., via the wireless backhaul links 609 and 611, respectively). An IAB donor node 604 may configure, control, or schedule UEs 606 and 608, via wireless access links 605 and 607, respectively. Thus, a CU of IAB donor node 64 may control or configure the entire IAB network that connects to the CN 602 via the IAB donor node 604, such as by using control messages or configuration messages (for example, a RRC configuration message or an F1 application protocol (F1AP) message).

As described above, the IAB network may include intermediate, non-anchor, IAB nodes (shown as IAB nodes 610, 612, 618, and 622) that connect to the CN 602 via the IAB donor node 604. As shown, an IAB node may include an MT and may include a DU. The MT of an IAB node (for example, a child node) may be controlled or scheduled by another IAB node (for example, a parent node) or by an IAB donor node 604. The DU of an IAB node (for example, a parent node) may control or schedule other IAB nodes (for example, child nodes of the parent node) or UEs. Thus, a DU may be referred to as a scheduling node or a scheduling component, and an MT may be referred to as a scheduled node or a scheduled component. As shown, the IAB node 610 may control or schedule the UE 616 (via wireless access link 615) and IAB nodes 618 and 622 (via wireless backhaul links 617 and 621, respectively); the IAB node 612 may schedule or control the UE 614 (via wireless access link 613); and the IAB nodes 618 and 622 may schedule or control the UEs 620 and 624, respectively (via the wireless access links 619 and 623, respectively).

A UE may include only an MT, and not a DU. That is, communications of a UE may be controlled or scheduled by an IAB donor node 604 or an IAB node (for example, a parent node of the UE).

When a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor node or an IAB node, and a child node may be an IAB node or a UE.

As shown in FIG. 6, a link between a UE and an IAB donor node, or between a UE and an IAB node, may be referred to as an access link (e.g., access links 605, 607, 613, 615, 619, 623). Each access link may be a wireless access link that provides a UE with radio access to CN 402 via the IAB donor node 604, and potentially via one or more intermediate IAB nodes.

As shown in FIG. 6, a link between an IAB donor node 604 and an IAB node, or between two IAB nodes, may be referred to as a backhaul link (e.g., backhaul links 609, 611, 617, 621). Each backhaul link may be a wireless backhaul link that provides an IAB node with radio access to CN 602 via the IAB donor node 604, and potentially via one or more other intermediate IAB nodes. In some aspects, a backhaul link may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links and backhaul links.

As described herein, an IAB donor may be a gNB with functions to control the IAB-network and may include a CU and DU(s). As described with respect to FIG. 4, a CU may include a CU-CP and CU-UP which may have an E1 interface, the CU-CP and the gNB DU(s) may have an F1-C interface, and the CU-UP and gNB DU(s) may have an F1-U interface. The CU may perform RRC and/or PDCP layer functions. The DU may be a scheduling node that schedules child nodes of this IAB-donor. The DU may perform RLC/MAC/PHY layer functions. An IAB-node is a layer-2 (L2) relay node including MT and DU functions, as described herein. The MT is a scheduled node similar to a UE scheduled by its parent IAB-node or IAB-donor and the DU is a scheduling node that schedules child nodes of this IAB-node.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

In an IAB layer 2 (L2) structure, access RLC channels may be between a DU and a UE to carry PDCP for RRC or DRB, and/or between a DU and MT to carry PDCP for RRC or DRB. Backhaul RLC channels may be between a DU and MT to carry BAP for backhauling of access traffic.

Figure 7:
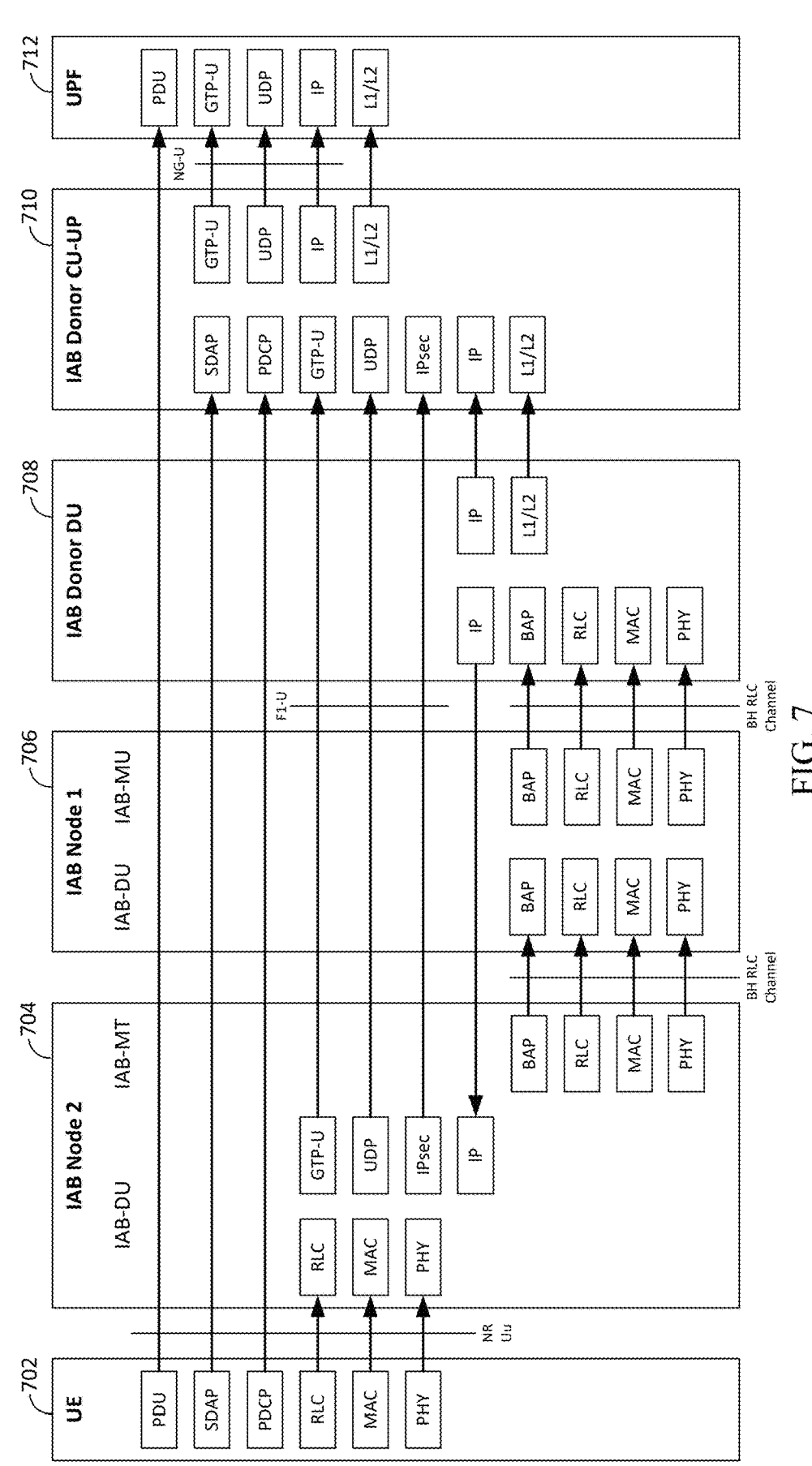
FIG. 7 is a block diagram showing examples for implementing a user-plane communication protocol stack in the example IAB architecture, in accordance with certain aspects of the present disclosure.

FIG. 7 is a block diagram showing examples for implementing a user-plane communication protocol stack 700 in the example IAB architecture, in accordance with certain aspects of the present disclosure. The user-plane communication protocol stack 700 is shown for a UE 702, two-intermediate nodes, IAB node 1 706 and IAB node 2 704, an IAB donor DU 708, an IAB donor CU-UP 710, and a UPF 712.

The UPF 712 may be in a core network (e.g., CN 602, 402, 132 illustrated in FIGS. 6, 4, 2, respectively). The UPF 712 may have an NG-U interface with the IAB donor CU-UP 710. As shown in FIG. 7, the UPF 712 may include a protocol data unit (PDU) layer, a GPRS tunneling protocol (GTP-U) layer, a user datagram protocol (UDP) layer, an Internet protocol (IP) layer, and a layer 1/layer 2 (L1/L2).

As shown in FIG. 7, the IAB donor CU-UP 710 may have a GTP-U layer, a UDP layer, L1/L2, a service data adaptation protocol (SDAP) layer, a PDCP layer, and an IPsec layer. The IAB donor DU 708 may have an IP layer, L1/L2, a backhaul adaptation protocol (BAP) layer, an RLC layer, a MAC layer, and a PHY layer. The IAB donor DU 708 may have an F1-U interface with an intermediate IAB node, IAB node 1 706. The IAB node 706 may include BAP, RLC, MAC, and PHY layers. The IAB node 706 may have a BH RLC channel with another intermediate IAB node, IAB node 2 704. The IAB node 704 may include GTP-U, UDP, IPsec, IP, BAP, RLC, MAC, and PHY layers. The IAB node 704 may have an NR-Uu link with the UE 702. The UE 702 may include PDU, SDAP, PDCP, RLC, MAC, and PHY layers.

Figure 8:
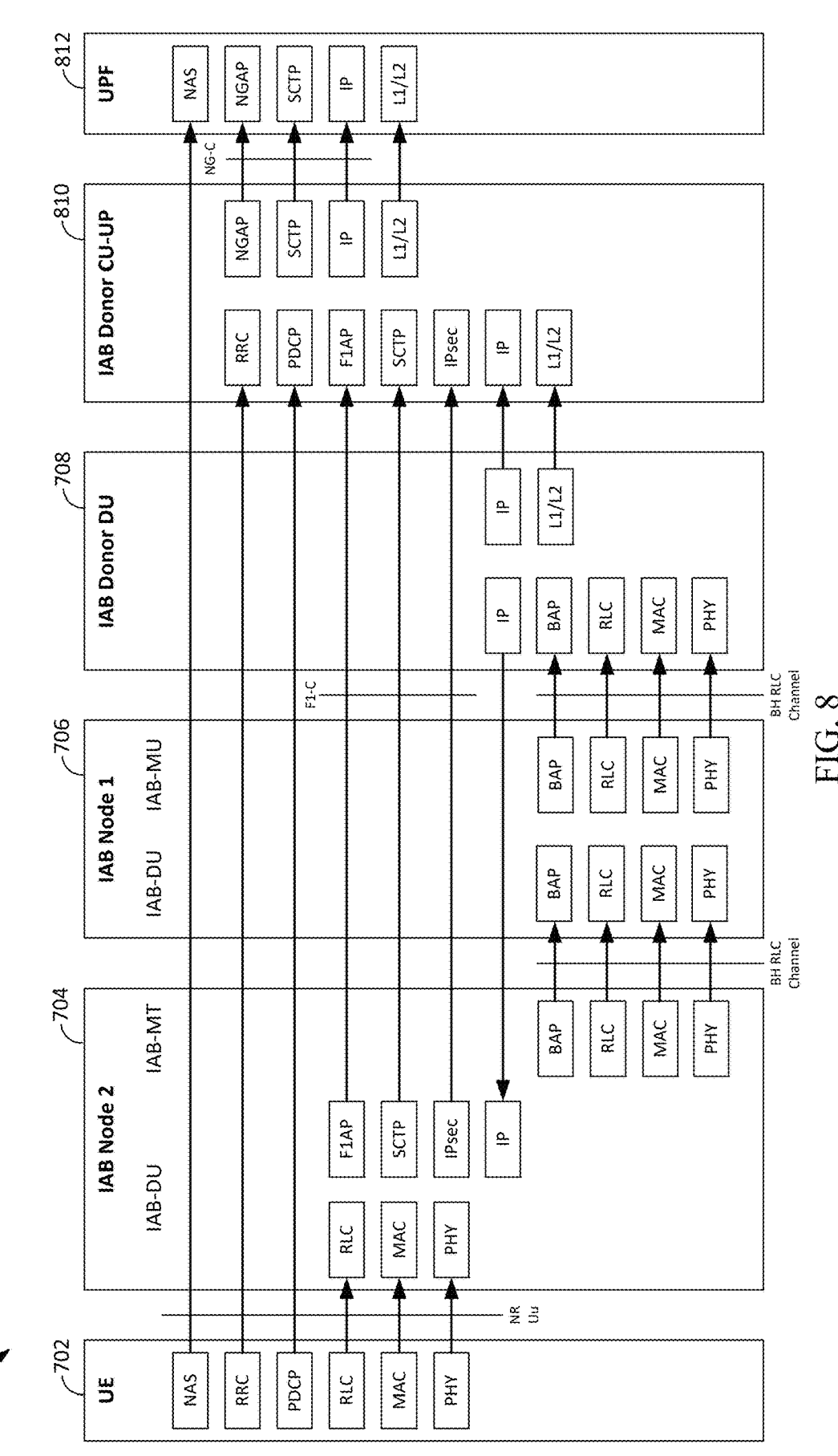
FIG. 8 is a block diagram showing examples for implementing a control-plane communication protocol stack in the example IAB architecture, in accordance with certain aspects of the present disclosure.

FIG. 8 is a block diagram showing examples for implementing a control-plane communication protocol stack 800 in an example IAB architecture, in accordance with certain aspects of the present disclosure. The control-plane communication protocol stack 800 is shown for a UE 702, two-intermediate nodes 704 and 706 (IAB nodes 1 and 2), an IAB donor DU 708, an IAB donor CU-CP 810, and an AMF 812.

The AMF 812 may be in a core network (e.g., CN 602, 402, 132 illustrated in FIGS. 6, 4, 2, respectively). The AMF 812 may have an NG-C interface with the IAB donor CU-CP 810. As shown in FIG. 8, the AMF 812 may include a non-access stratum (NAS) layer, an NG application protocol (NGAP) layer, a session control protocol (SCP) layer, an IP layer, and L1/L2. As shown in FIG. 8, the IAB donor CU-CP 810 may have an NGAP layer, session control transmission protocol (SCTP) layer, IP, L1/L2, RRC, PDCP, and F1AP layers.

Where as in LTE, quality-of-service (QOS) is enforced at the evolved packet system (EPS) bearer level, in 5G, QOS is enforced at the QoS flow level. For example, LTE uses EPS bearers assigned an EPS bearer ID, and 5G uses 5G QOS flows each identified by a QoS flow ID (QFI). 5G supports guaranteed bit rate (GBR) and non-GBR flows, along with a new delay-critical GBR. 5G also introduces reflective QoS.

The QoS flow may be the lowest level of granularity of QOS differentiation in a protocol data unit (PDU) session within the 5G system. The QoS flow is where policy and charging are enforced. One or more service data flows (SDFs) may be transported in the same QoS flow, if they share the same policy and charging rules. All traffic within the same QoS flow receives the same treatment. Within the 5G system (5GS), a QoS flow is controlled by the 5G session management function (SMF) and may be preconfigured, or established via the PDU session establishment procedure or the PDU session modification procedure. A QoS flow is characterized by a QoS profile provided by the SMF, one or more QoS rules (and optionally QoS flow level QoS parameters associated with the QoS rules), and one or more uplink and downlink packet delivery ratio (PDR). A QOS flow associated with the default QoS rule is established for a PDU session and remains established throughout the lifetime of the PDU session.

5G QoS identifier (5QI) values provide QOS characteristics (e.g., resource type, priority level, packet delay budget (PDB), packet error rate (PER), default maximum data burst volume, default averaging window, example services). An illustrative example of 5QI values mapped to QoS characteristics is provided in Table 5.7.4-1 of 3GPP TS 23.501.

One or more QoS flows can be mapped to a data radio bearer (DRB), for example at the SDAP layer. In some systems, such as Rel-16 5G NR, QOS information is provided by the CU to a serving DU for a UE per DRB and per QoS flow via the F1-AP interface. A UE context setup message, such as over the F1-AP interface, may include QOS information and/or time sensitive communications (TSC) as provided, for example, in TS 38.473, Section 9.2.2.1; QoS flow level QoS parameters IE as provided in TS 38.473, Section 9.3.1.45; dynamic 5QI descriptor as provided TS 38.473, Section 9.3.1.47; and/or non-dynamic 5QI descriptor as provided TS 38.473, Section 9.3.1.49.

Figure 9:
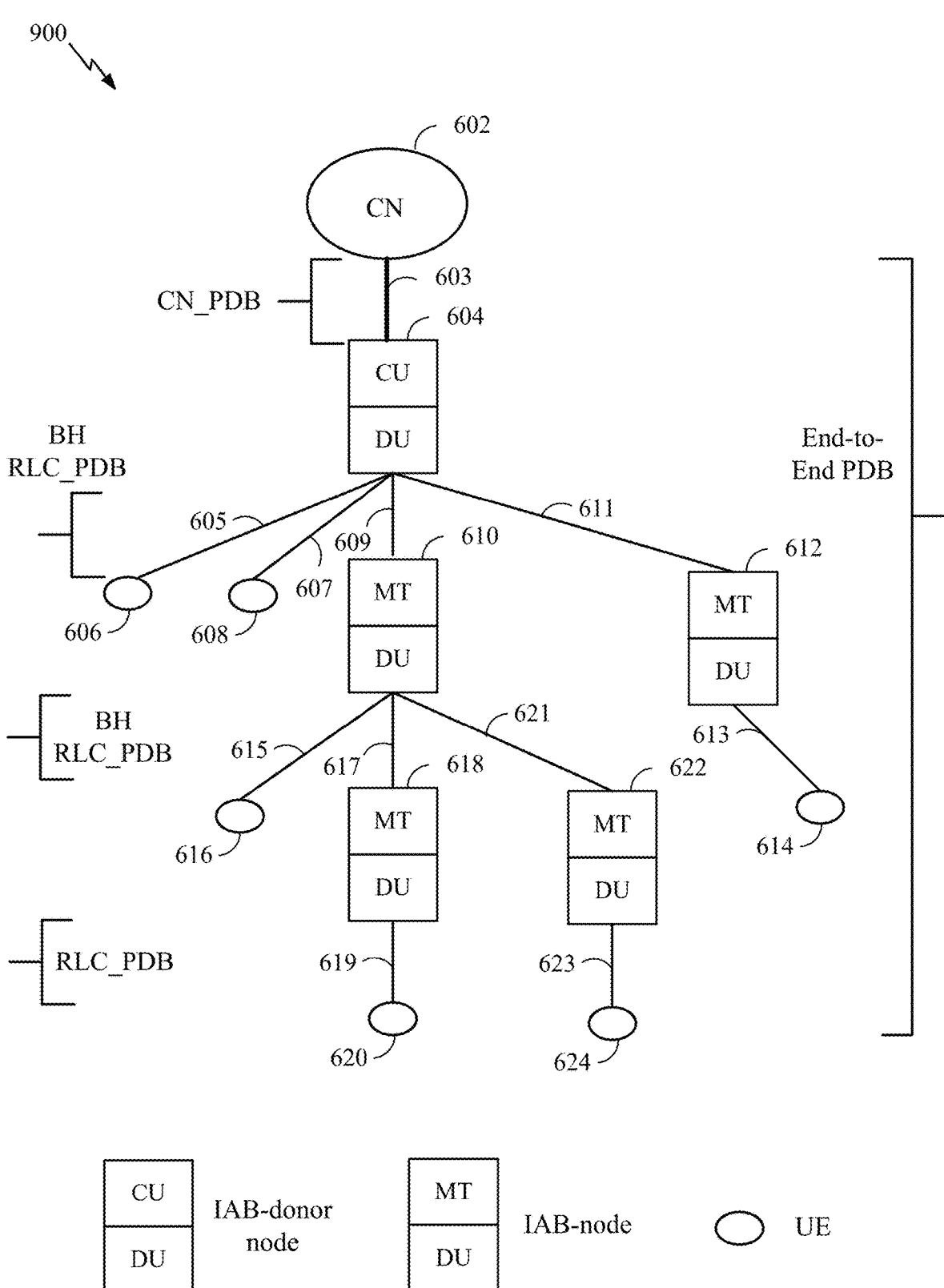
FIG. 9 illustrates packet delay budgets (PDB) for an IAB network, in accordance with certain aspects of the present disclosure.

As shown in FIG. 9, and end-to-end PDB may be between the UPF (e.g., terminating at the N6 interface) and the UE. As shown in FIG. 9, a core network PDB (CN_PDB) may be defined/indicated between the core network 602 (e.g., the UPF terminating at the N6 interface) and the 5G-AN (e.g., the IAB donor node 604). The CN_PDB can be a static value defined by 5QI or dynamically configured by CU via F1-AP. For example, TS 23.501, Section 5.7.3.4, defines PDB as the upper bound for the time that a packet may be delayed between the UE and the UPF that terminates the N6 interface. For a certain 5QI the value of the PDB is the same in UL and DL. In the case of 3GPP access, the PDB is used to support the configuration of scheduling and link layer functions (e.g. the setting of scheduling priority weights and HARQ target operating points). The 5G Access Network Packet Delay Budget (5G-AN PDB) is determined by subtracting a static value for the Core Network Packet Delay Budget (CN PDB), which represents the delay between any UPF terminating N6 (that may possibly be selected for the PDU Session) and the 5G-AN from a given PDB. For a standardized 5QI, the static value for the CN PDB can be specified in the QoS characteristics TS 23.501, Table 5.7.4-1. For a non-standardized 5QI, the static value for the CN PDB can be homogeneously configured in the network.

In IAB networks (e.g., such as the IAB network illustrated in FIG. 9), in addition to the CN-PDB and end-to-end PDB, an RLC channel PDB may be defined/indicated for each BH RLC channel. The end-to-end PDB may be provided to serving nodes. The BH_RLC PDB may be provided to each intermediate IAB-DU. The RLC PDB may be define the delay upper bound between the IAB-DU and child-MT, as shown in FIG. 9. The end-to-end PDB, CN_PDB, and RLC_PDB may be provided per DRB and per QoS flow.

Assistance information can be exchanged between nodes. For example, TS 38.425, Figure 5.5.2.3-1 shows assistance information data format. TS 38.425, Sections 5.5.3.38, 5.5.3.39, 5.5.3.48, and 5.5.3.49 provides certain assistance information type and radio quality assistance information in an NG-RAN. TS 38.425, Sections 5.6.3.5 and 5.5.3.6 provides for a desired buffer size for a DRB and a desired data rate.

In some IAB systems (e.g., as per R16 description in TS38.473), for the BH RLC channel, the BH_RLC PDB may define an upper bound for a time that a packet may be delayed between the IAB-DU and the child-MT. However, there is some ambiguity in a definition of the BH_RLC PDB as it is not clear if a latency bound is across a full stack or a partial stack of the BH RLC channel. For instance, it is not clear by the definition of the BH_RLC PDB if the latency bound is between the BAP layers of the IAB-DU and the child-MT. In another instance, it is also not clear by the definition of the BH_RLC PDB if the latency bound may only account for over-the-air transmission time between the IAB-DU and the child-MT. Accordingly, it is desirable that the ambiguity in the existing R16 description of the BH_RLC PDB for the BH RLC channel may be clarified.

Additionally, the IAB nodes from different vendors may have different stack processing time. Depending on implementation of the IAB nodes within the IAB network (e.g., such as the IAB network illustrated in FIG. 9), the stack processing time of each IAB node may be needed by the CU-CP (e.g., such as the IAB donor CU-CP 810 illustrated in FIG. 9), or a parent node of the IAB node, or both the CU-CP and the parent node for determination of the BHRLC_PDB and/or scheduling priority together with the BHRLC_PDB.

Aspects of the present disclosure provide techniques for determining and defining the BH_RLC PDB over a full or a part of a stack of the BH RLC channel between the IAB-DU and the child-MT. Aspects of the present disclosure further provide techniques for signaling enhancements for the IAB-DU to report its stack processing time capability to the CU-CP or a parent IAB node of the IAB-DU. Aspects of the present disclosure may help provide latency optimization, topology-wide fairness, improve multi-hop latency, and improve congestion mitigation.

Example PDB Enhancements for a RLC Channel in an IAB Network

As discussed above, an integrated access and backhaul (IAB) node, such as the IAB donor node 604 illustrated in FIG. 9, may determine packet delay budgets (PDBs) for radio link control (RLC) channels in the IAB network. The IAB donor node may configure the PDBs for uplink (UL) and/or downlink (DL) at the IAB nodes (e.g., intermediate IAB nodes) in the IAB network. The PDBs for the RLC channels may be a one-hop PDB for each of the RLC channels. The RLC channels may include backhaul (BH) RLC channels between the intermediate nodes and access RLC channels between serving IAB nodes and a user equipment (UE). An end-to-end PDB may also be configured, for example, at the serving IAB nodes. The IAB donor node may configure the one-hop PDBs to ensure that the end-to-end PDBs are achieved.

Aspects of the present disclosure provide techniques for determining and defining the PDB for the RLC channel between the IAB nodes across a full protocol stack or a partial protocol stack in the IAB network. The IAB nodes may include a first IAB node and a second IAB node. The second IAB node may be a child of the first IAB node. The PDB for the RLC channel between the first node and the second node may be defined as a delay upper bound of a packet across the full protocol stack or the partial protocol stack of the RLC channel between a distributed unit (DU) of the first IAB node and a mobile terminal (MT) of the second IAB node. The techniques may apply to both the UL direction and the DL direction.

Figure 10:
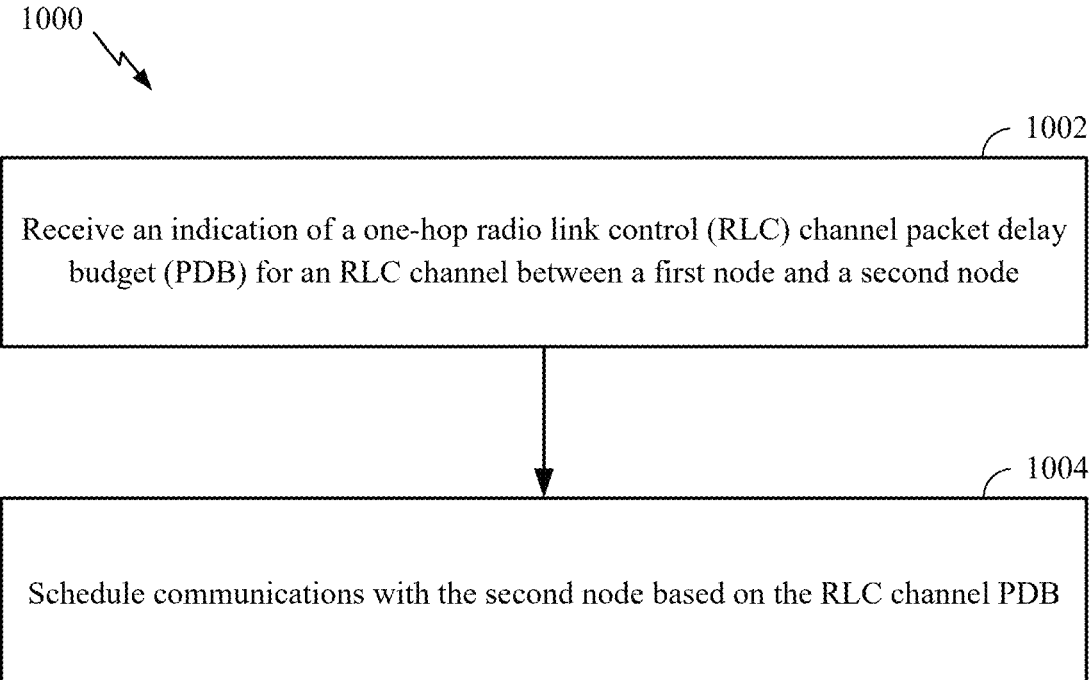
FIG. 10 is a flow diagram illustrating example operations for wireless communication by a first node, in accordance with certain aspects of the present disclosure.

FIG. 10 is a flow diagram illustrating example operations 1000 for wireless communication, in accordance with certain aspects of the present disclosure. The operations 1000 may be performed, for example, by a first node. The first node is an IAB node (e.g., such as the BS 110a in the wireless communication network 100). The first node is associated with a second node, which is a child IAB node or a UE (e.g., the UE 120a in the wireless communication network 100 of FIG. 1) of the first node. The operations 1000 may be implemented as software components that are executed and run on one or more processors (e.g., controller/processor 240 of FIG. 2). Further, transmission and reception of signals by the first node in operations 1000 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1000 may begin, at 1002, by receiving an indication of a one-hop RLC channel PDB (for example, BH_RLC PDB illustrated in FIG. 9) for an RLC channel (for example, BH RLC channel illustrated in FIG. 7) between the first node (for example, the IAB-DU illustrated in FIG. 9 and/or the IAB node 1 706 illustrated in FIG. 7) and the second node (for example, the child-MT illustrated in FIG. 9 and/or the IAB node 2 704 illustrated in FIG. 7). The indication of the one-hop RLC channel PDB is semi-statically configured by a central unit (for example, the IAB donor CU-CP 810 illustrated in FIG. 9 and/or the IAB donor CU-UP 710 illustrated in FIG. 7).

In some examples, the one-hop RLC channel PDB for the RLC channel is across a full protocol stack of the RLC channel. In some examples, the one-hop RLC channel PDB for the RLC channel is across a partial protocol stack of the RLC channel. The protocol stack of the RLC channel is between a DU of the first node (for example, IAB-DU 714 of the IAB node 1 706 illustrated in FIG. 7) and a MT of the second node (for example, IAB-MT 716 of the IAB node 2 704 illustrated in FIG. 7).

In some cases, the one-hop RLC channel PDB is across the full protocol stack between backhaul adaption protocol (BAP) layers of the first node and the second node (for instance, a BAP layer of the IAB-DU 714 and a BAP layer of the IAB-MT 716 illustrated in FIG. 7). In one non-limiting example, for the DL, the one-hop RLC channel PDB is between an ingress of a packet at a BAP layer at the first node (for example, the ingress of the packet at the BAP layer at the IAB-DU 714 illustrated in FIG. 7) and an egress of the packet at the BAP layer at the second node (for example, the egress of the packet at the BAP layer at the IAB-MT 716 illustrated in FIG. 7). In another non-limiting example, for the UL, the one-hop RLC channel PDB is between the ingress of the packet at the BAP layer at the second node (for example, the ingress of the packet at the BAP layer at the IAB-MT 716 illustrated in FIG. 7) and the egress of the packet at the BAP layer at the first node (for example, the egress of the packet at the BAP layer at the IAB-DU 714 illustrated in FIG. 7). The one-hop RLC channel PDB may include stack processing time at the first node, stack processing time at the second node, and over-the-air transmission time.

In some cases, the one-hop RLC channel PDB is across the partial protocol stack between an ingress of a packet at a BAP layer at a transmission node and a reception of an acknowledgment for the packet at the transmission node. In one non-limiting example, for the DL, the one-hop RLC channel PDB is between an ingress of a DL packet at the BAP layer at the first node (for example, the ingress of the DL packet at the BAP layer at the IAB-DU 714 illustrated in FIG. 7) and a reception of a hybrid automatic repeat request (HARQ) acknowledgment for the DL packet at the first node. In another non-limiting example, for the UL, the one-hop RLC channel PDB is between an ingress of an UL packet at a BAP layer at the second node (for example, the ingress of the UL packet at the BAP layer at the IAB-MT 716 illustrated in FIG. 7) and a reception of a new grant for a same HARQ process at the second node. The one-hop RLC channel PDB may include stack processing time at the transmission node (i.e., the first node for the DL and the second node for the UL) and over-the-air transmission time.

In some cases, the one-hop RLC channel PDB is across the partial protocol stack between a first transmission of a packet over-the-air by a transmission node and a reception of an acknowledgment for the packet at the transmission node. In one non-limiting example, for the DL, the one-hop RLC channel PDB is between a first transmission of a DL packet at the first node and a reception of a HARQ acknowledgment for the DL packet at the first node. In another non-limiting example, for the UL, the one-hop RLC channel PDB is between a first transmission of an UL packet at the second node and a reception of a new grant (i.e., with new data indication flipped) for a same HARQ process at the second node. The one-hop RLC channel PDB may include over-the-air transmission time.

At 1004, the first node schedules communications with the second node based on the one-hop RLC channel PDB.

Figure 11:
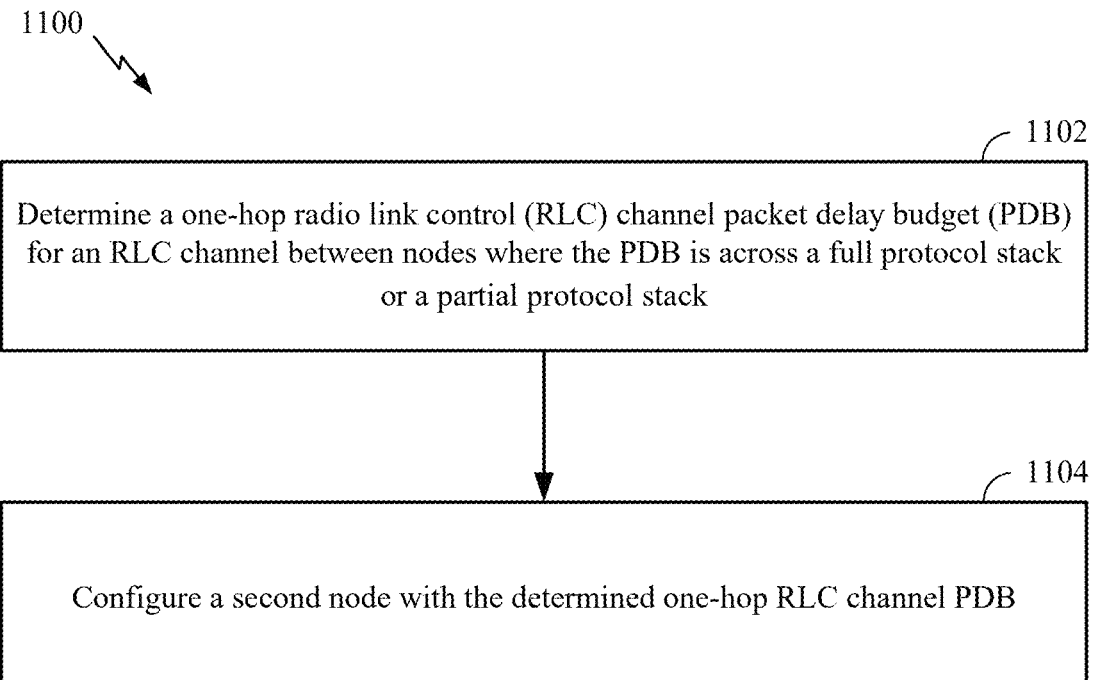
FIG. 11 is a flow diagram illustrating example operations for wireless communication by a first node, in accordance with certain aspects of the present disclosure.

FIG. 11 is a flow diagram illustrating example operations 1100 for wireless communication, in accordance with certain aspects of the present disclosure. The operations 1100 may be performed, for example, by a first node. The first node may be an IAB donor node (e.g., with a wired connection to a core network), which may be a base station (e.g., such as the BS 110a in the wireless communication network 100). The first node may be associated with a second node, which is an IAB node. The second node may be associated with a third node. The third node is a child IAB node or a UE (e.g., the UE 120a in the wireless communication network 100 of FIG. 1) of the second node. The operations 1100 may be implemented as software components that are executed and run on one or more processors (e.g., controller/processor 240 of FIG. 2). Further, transmission and reception of signals by the first node in operations 1000 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1100 may begin, at 1102, by determining a one-hop RLC channel PDB (for example, BH_RLC PDB illustrated in FIG. 9) for an RLC channel (for example, BH RLC channel illustrated in FIG. 7) between nodes, such as the second node (for example, the IAB-DU illustrated in FIG. 9 and/or the IAB node 1 706 illustrated in FIG. 7) and the third node (for example, the child-MT illustrated in FIG. 9 and/or the IAB node 2 704 illustrated in FIG. 7). The PDB is across a full protocol stack or a partial protocol stack of the RLC channel between the second node and the third node. The protocol stack of the RLC channel is between a DU of the second node (for example, IAB-DU 714 of the IAB node 1 706 illustrated in FIG. 7) and a MT of the third node (for example, IAB-MT 716 of the IAB node 2 704 illustrated in FIG. 7).

At 1104, the first node (for example, the IAB donor CU-CP 810 illustrated in FIG. 9 and/or the IAB donor CU-UP 710 illustrated in FIG. 7) configures the second node with the determined one-hop RLC channel PDB. In one non-limiting example, the first node semi-statically configures the second node with the determined one-hop RLC channel PDB.

In some cases, based on the configuration by the first node, the one-hop RLC channel PDB is across the full protocol stack between BAP layers of the second node and the third node (for instance, a BAP layer of the IAB-DU 714 and a BAP layer of the IAB-MT 716 illustrated in FIG. 7). In one non-limiting example, for DL, the one-hop RLC channel PDB is between an ingress of a packet at a BAP layer at the second node (for example, the ingress of the packet at the BAP layer at the IAB-DU 714 illustrated in FIG. 7) and an egress of the packet at the BAP layer at the third node (for example, the egress of the packet at the BAP layer at the IAB-MT 716 illustrated in FIG. 7). In another non-limiting example, for UL, the one-hop RLC channel PDB is between the ingress of the packet at the BAP layer at the third node (for example, the ingress of the packet at the BAP layer at the IAB-MT 716 illustrated in FIG. 7) and the egress of the packet at the BAP layer at the second node (for example, the egress of the packet at the BAP layer at the IAB-DU 714 illustrated in FIG. 7).

In some cases, based on the configuration by the first node, the one-hop RLC channel PDB is across the partial protocol stack between an ingress of a packet at a BAP layer at a transmission node and a reception of an acknowledgment for the packet at the transmission node. In one non-limiting example, for the DL, the one-hop RLC channel PDB is between an ingress of a DL packet at the BAP layer at the second node (for example, the ingress of the DL packet at the BAP layer at the IAB-DU 714 illustrated in FIG. 7) and a reception of a HARQ acknowledgment for the DL packet at the second node. In another non-limiting example, for the UL, the one-hop RLC channel PDB is between an ingress of an UL packet at the BAP layer at the third node (for example, the ingress of the UL packet at the BAP layer at the IAB-MT 716 illustrated in FIG. 7) and a reception of a new grant for a same HARQ process at the third node.

In some cases, based on the configuration by the first node, the one-hop RLC channel PDB is across the partial protocol stack between a first transmission of a packet over-the-air by a transmission node and a reception of an acknowledgment for the packet at the transmission node. In one non-limiting example, for the DL, the one-hop RLC channel PDB is between a first transmission of a DL packet at the second node and a reception of a HARQ acknowledgment for the DL packet at the second node. In another non-limiting example, for the UL, the one-hop RLC channel PDB is between a first transmission of an UL packet at the third node and a reception of a new grant for a same HARQ process at the third node.

Aspects of the present disclosure further provide one or more techniques for signaling for the IAB node to report a capability of a stack processing time of the IAB node to the IAB donor node or a parent IAB node of the IAB node. The IAB donor node may use the stack processing time of the IAB node to determine the PDB for the RLC channel. The parent IAB node may the stack processing time of the IAB node for scheduling optimization for the RLC channel.

Figure 12:
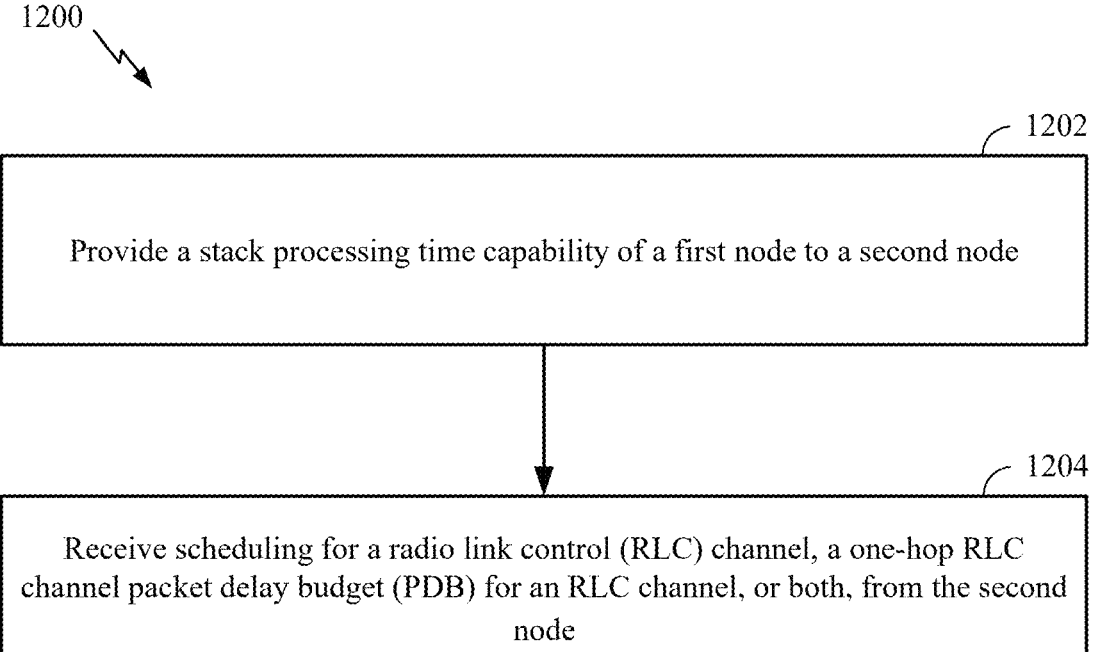
FIG. 12 is a flow diagram illustrating example operations for wireless communication by a first node, in accordance with certain aspects of the present disclosure.

FIG. 12 is a flow diagram illustrating example operations 1200 for wireless communication, in accordance with certain aspects of the present disclosure. The operations 1200 may be performed, for example, by a first node. The first node is an IAB node (e.g., such as the BS 110a in the wireless communication network 100). The first node is associated with a second node. The second node may be an IAB donor node (e.g., a CU with a wired connection to a core network). The second node may be a parent IAB node of the first node. The operations 1200 may be implemented as software components that are executed and run on one or more processors (e.g., controller/processor 240 of FIG. 2). Further, transmission and reception of signals by the first node in operations 1200 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1200 may begin, at 1202, by providing a stack processing time capability of the first node (for example, the IAB-DU illustrated in FIG. 9) to the second node. In some cases, when the second node is the IAB donor node (for example, the IAB donor CU-CP 810 illustrated in FIG. 9), the first node provides the stack processing time capability of the first node to the second node via a radio resource control (RRC) message. In some cases, when the second node is the IAB donor node, the first node provides the stack processing time capability of the first node to the second node via an F1 interface message (F1-AP).

In some cases, when the second node is the parent IAB node of the first node, the first node provides the stack processing time capability of the first node directly to the second node via a medium access control (MAC)-control element (MAC-CE). In some cases, when the second node is the parent IAB node of the first node, the first node provides the stack processing time capability of the first node indirectly to the second node via the IAB donor node by a RRC message. In some cases, when the second node is the parent IAB node of the first node, the first node provides the stack processing time capability of the first node indirectly to the second node via the IAB donor node by an F1 interface message (F1-AP).

At 1204, the first node receives scheduling for a RLC channel, a one-hop RLC channel PDB for the RLC channel, or both, from the second node.

When the second node is the IAB donor node, the second node uses the stack processing time capability of the first node to determine the one-hop RLC channel PDB for the RLC channel, and the first node receives the one-hop RLC channel PDB for the RLC channel from the second node. In some cases, the second node uses the stack processing time capability to determine the one-hop RLC channel PDB, and then configure the first node with the one-hop RLC channel PDB for the RLC channel when the stack processing time of the first node is comparable to over-the-air transmission time.

When the second node is the parent IAB node of the first node, the RLC channel is between the first node and the second node. When the second node is the CU of the IAB donor node, the RLC channel is between the first node and a third node. The third node is an IAB node. The first node is the parent IAB node of the third node.

The one-hop RLC channel PDB for the RLC channel is associated with a quality-of-service (QOS) flow. The one-hop RLC channel PDB for the RLC channel is associated with a data radio bearer (DRB). The one-hop RLC channel PDB for the RLC channel is associated with a backhaul RLC channel, which aggregates one or more QoS flows and/or one or more DRBs for one or more UEs.

When the second node is the parent node of the first node, the second node uses the stack processing time capability of the first node to determine the scheduling for the RLC channel, and the first node receives the scheduling for the RLC channel from the second node. In some cases, the second node uses the stack processing time capability of the first node to determine over-the-air latency bounds from the one-hop RLC channel PDB for the RLC channel as indicated by the IAB donor node. The second node uses the determined over-the-air latency bounds to make optimized scheduling decision for the RLC channel over its child nodes and links.

Figure 13:
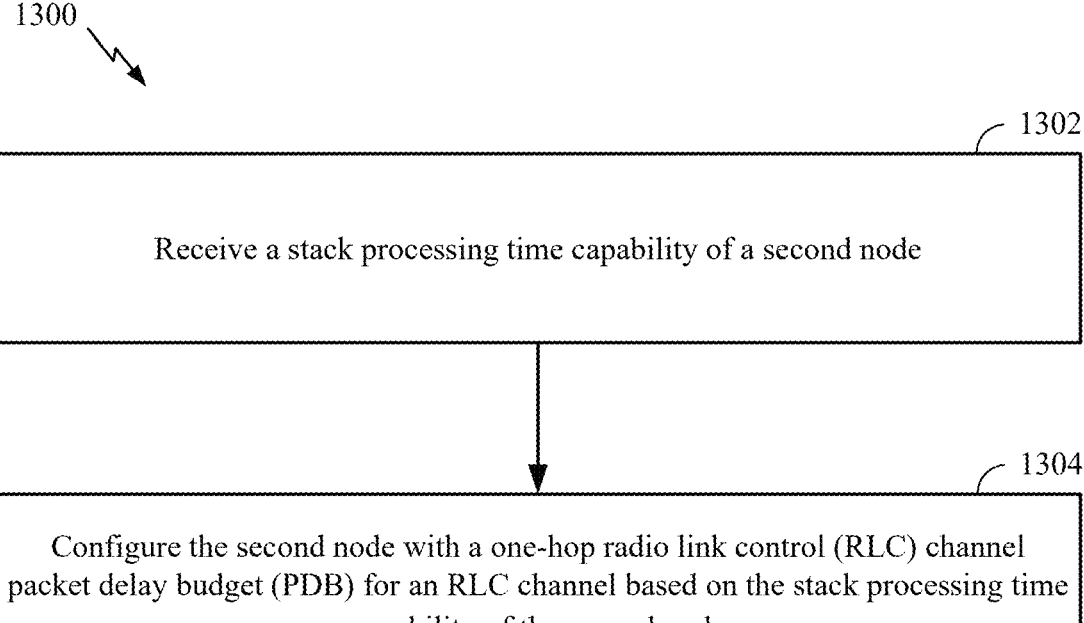
FIG. 13 is a flow diagram illustrating example operations for wireless communication by a first node, in accordance with certain aspects of the present disclosure.

FIG. 13 is a flow diagram illustrating example operations 1300 for wireless communication, in accordance with certain aspects of the present disclosure. The operations 1300 may be performed, for example, by a first node. The first node may be an IAB donor node (e.g., with a wired connection to a core network), which may be a base station (e.g., such as the BS 110*a* in the wireless communication network 100). The first node may be associated with a second node, which is an IAB node. The second node may have a direct or indirect connection to the first node via one or more intermediate IAB nodes. The operations 1300 may be implemented as software components that are executed and run on one or more processors (e.g., controller/processor 240 of FIG. 2). Further, transmission and reception of signals by the first node in operations 1300 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1300 may begin, at 1302, by receiving a stack processing time capability of a second node (for example, the IAB-DU illustrated in FIG. 9). In some cases, the first node (for example, the IAB donor CU-CP 810 illustrated in FIG. 9) receives the stack processing time capability of the second node via a RRC message. In some cases, the first node receives the stack processing time capability of the second node via an F1 interface message (F1-AP).

At 1304, the first node determines a one-hop RLC channel PDB for a RLC channel, based on the stack processing time capability of the second node. In some cases, the first node determines the one-hop RLC channel PDB for the RLC channel based on the stack processing time capability of the second node when the stack processing time of the second node is comparable to over-the-air transmission time. Upon determination of the one-hop RLC channel PDB for the RLC channel, the first node configures the second node with the one-hop RLC channel PDB for the RLC channel.

Figure 14:
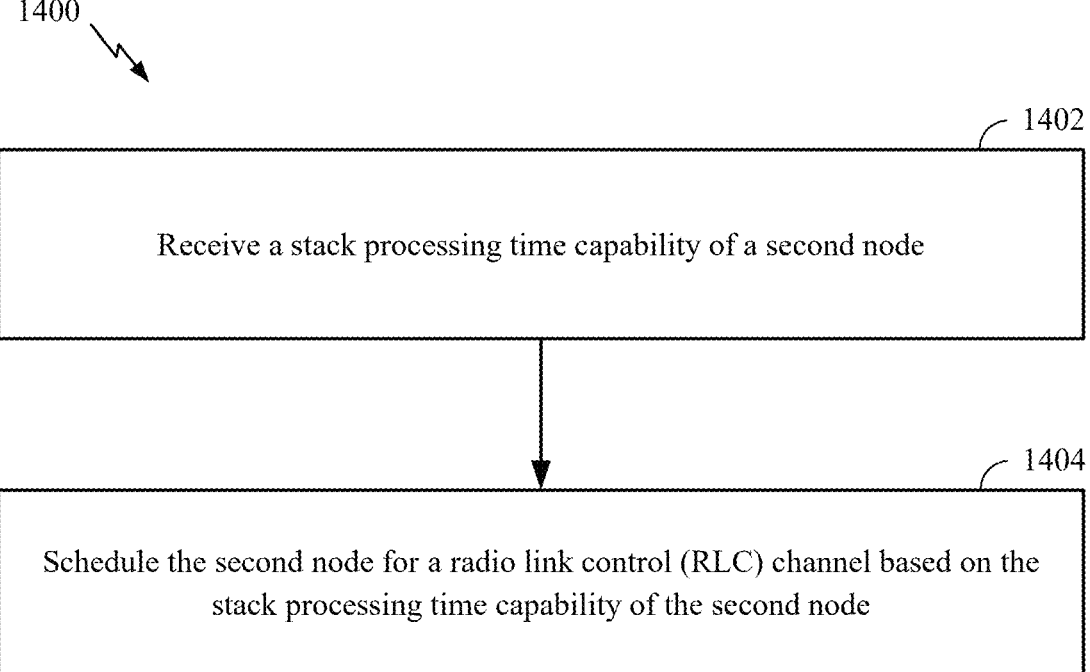
FIG. 14 is a flow diagram illustrating example operations for wireless communication by a first node, in accordance with certain aspects of the present disclosure.

FIG. 14 is a flow diagram illustrating example operations 1400 for wireless communication, in accordance with certain aspects of the present disclosure. The operations 1400 may be performed, for example, by a first node. The first node is an IAB node (e.g., such as the BS 110*a* in the wireless communication network 100). The first node is associated with a second node such that the first node is a parent IAB node of the second node. The operations 1400 may be implemented as software components that are executed and run on one or more processors (e.g., controller/ processor 240 of FIG. 2). Further, transmission and reception of signals by the first node in operations 1200 may be enabled, for example, by one or more antennas (e.g., antennas 234 of FIG. 2). In certain aspects, the transmission and/or the reception of the signals by the first node may be implemented via a bus interface of one or more processors (e.g., controller/processor 240) obtaining and/or outputting the signals.

The operations 1400 may begin, at 1402, by receiving a stack processing time capability of the second node (for example, the IAB-DU illustrated in FIG. 9). In some cases, the first node directly receives the stack processing time capability of the second node via a MAC-CE. In some cases, the first node indirectly receives the stack processing time capability of the second node via an IAB donor node (for example, the IAB donor CU-CP 810 illustrated in FIG. 9) by a RRC message. In some cases, the first node indirectly receives the stack processing time capability of the second node via the IAB donor node by an F1 interface message (F1-AP).

At 1404, the first node schedules the second node for a RLC channel based on the stack processing time capability of the second node.

In some cases, the first node transmits a stack processing time capability of the first node to a third node. When the third node is an IAB donor node (for example, the IAB donor CU-CP 810 illustrated in FIG. 9), the first node provides the stack processing time capability to the third node via a RRC message or an F1 interface message (F1-AP). When the third node is the parent IAB node of the first node, the first node provides the stack processing time capability directly to the third node via a MAC-CE. Also, when the third node is the parent IAB node of the first node, the first node provides the stack processing time capability indirectly to the third node via the IAB donor node by the RRC message or the F1 interface message. The first node receives scheduling for a RLC channel, a one-hop RLC channel PDB for the RLC channel, or both, from the third node.

Figure 15:
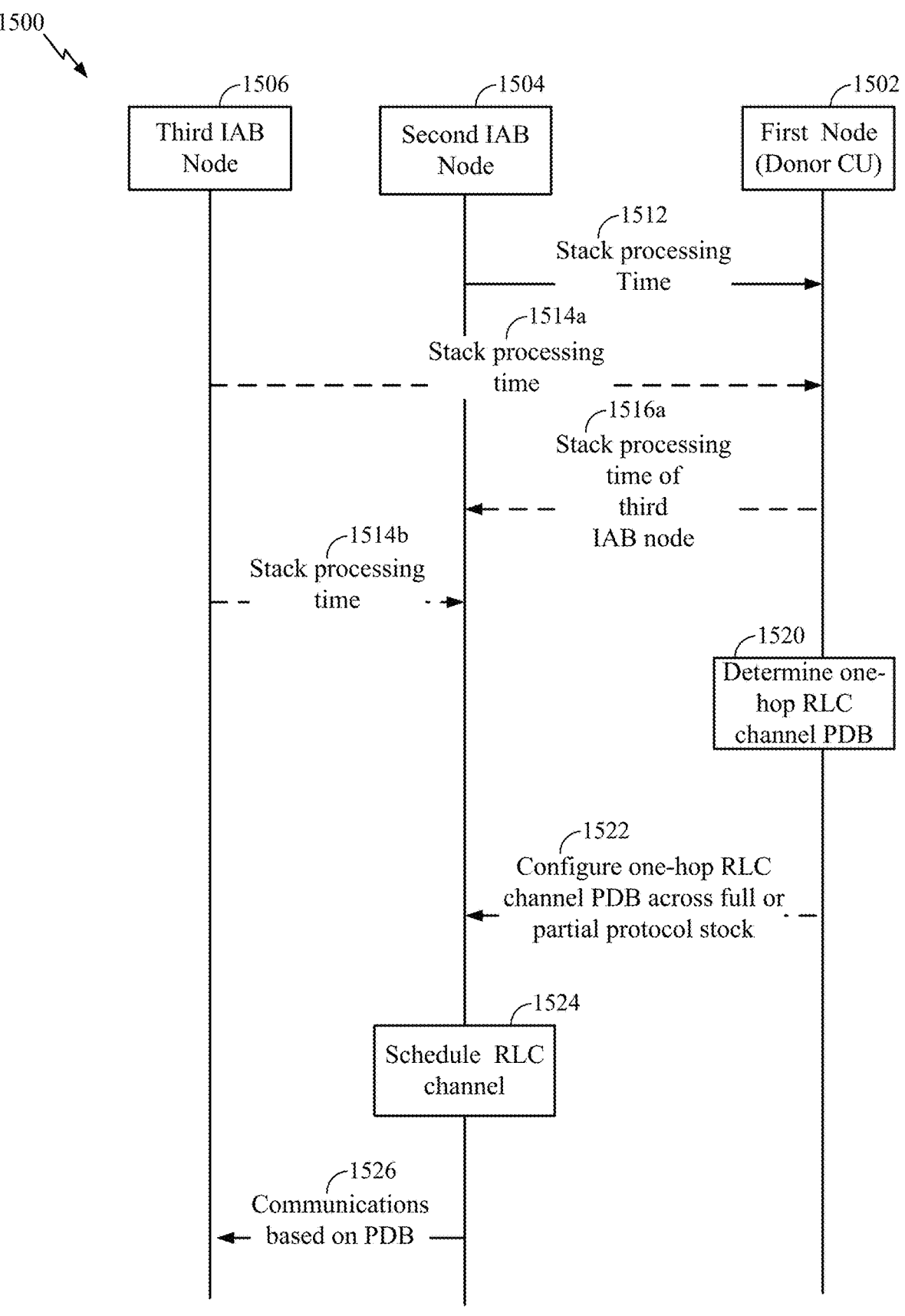
FIG. 15 is a call flow diagram illustrating example signaling for PDB enhancements for a backhaul (BH) radio link control (RLC) in an IAB network, in accordance with aspects of the present disclosure.

FIG. 15 is a call flow 1500 illustrating example signaling for PDB enhancements for a BH RLC in an IAB network, in accordance with aspects of the disclosure. As shown in FIG. 15, a second IAB node 1504 may send a stack processing time capability of the second IAB node 1504 to a first node 1502 (e.g., a CU of a donor IAB node), at 1512. Optionally, at 1514*a*, a third IAB node 1506 may send a stack processing time capability of the third IAB node 1506 to the first node 1502, and then at 1516*a*, the first node 1502 may send the stack processing time capability of the third IAB node 1506 to the second IAB node 1504. Alternatively, at 1514*b*, the third IAB node 1506 may send the stack processing time capability of the third IAB node 1506 directly to the second IAB node 1504.

At 1520, the first node 1502 may determine a one-hop RLC channel PDB for an RLC channel using the stack processing time capability of the second IAB node 1504. At 1522, the first node 1502 may configure the determined one-hop RLC channel PDB across a full protocol stock or a partial protocol stock at the second IAB node 1504. At 1524, the second IAB node 1504 may schedule the RLC channel (e.g., based on the stack processing time capability of the third IAB node 1506 and/or the PDB). At 1526, the second IAB node 1504 may communicate with the third IAB node 1506, which may be a child IAB node of the second IAB node 1504 based on the configured PDB.

Example Assistance Information for PDB Determination in IAB Networks

In some aspects, an integrated access and backhaul (IAB) donor node, such as the IAB donor node 604 illustrated in FIG. 9, may determine packet delay budgets (PDBs) for the radio link control (RLC) channels in an IAB network. The IAB donor node may configured the PDBs for uplink and/or downlink at the IAB nodes (e.g., intermediate IAB nodes) in the IAB network. The PDBs for the RLC channels may be a one-hop PDB for each of the RLC channels. The RLC channels may include backhaul (BH) RLC channels between intermediate nodes and access RLC channels between serving IAB nodes and user equipment (UE). An end-to-end PDB may also be configured, for example, at the serving IAB nodes. The IAB node may configure the one-hop PDBs to ensure that the end-to-end PDBs are achieved.

Aspects of the present disclosure describe techniques for determining a one-hop PDB in an IAB network. According to certain aspects, the determination of the one-hop PDB may be at the central unit control plane (CU-CP) of the IAB donor node and the CU-CP may receive assistance information from a central unit user plane (CU-UP) of the IAB donor node and may use the assistance information in determining the one-hop PDBs. The assistance information may be received via an E1 interface between the CU-CP and the CU-CP.

FIG. 16 is a flow diagram illustrating example operations 1600 for wireless communication, in accordance with certain aspects of the present disclosure. The operations 1600 may be performed, for example, by a first node. The first node may be an IAB donor node (e.g., with a wired connection to a core network), which may be a base station (e.g., such as the BS 110*a* in the wireless communication network 100). The operations 1600 may be implemented as software components that are executed and run on one or more processors (e.g., controller/processor 240 of FIG. 2). Further, the transmission and reception of signals by the first node in operations 1600 may be enabled, for example, by one or more antennas (e.g., antennas 234 of FIG. 2). In certain aspects, the transmission and/or reception of signals by the first node may be implemented via a bus interface of one or more processors (e.g., controller/processor 240) obtaining and/or outputting signals.

The operations 1600 may begin, at 1602, by obtaining assistance information for determining one or more one-hop RLC channel PDBs for one or more other nodes. In some examples, the assistance information is received at a CU-CP of the first node from a CU-UP of the first node. In some examples, the assistance information is received via an E1 interface.

In some examples, the assistance information includes user plane information forwarded, by the CU-UP, from one or more distributed units (DUs) including, from each of the one or more nodes. The assistance information may be associated with a data radio bearer (DRB), an RLC channel, or both. In some examples, the assistance information includes average channel quality indicator (CQI), average number hybrid automatic repeat request (HARQ) retransmissions, average HARQ failure, downlink radio quality index, uplink radio quality index, downlink delay, uplink delay, buffer loading, a desired buffer size, or a combination thereof. The assistance information, from the CU-UP, may include a full set or a subset of the information from the one or more DUs, processed information, or a combination thereof.

In some examples, the first node also receives one or more Layer 3 (L3) measurement reports from one or more of the nodes and determines the one or more one-hop RLC channel PDBs is further based on the one or more measurement reports.

At 1604, the first node determines the one or more one-hop RLC channel PDBs for the one or more other nodes based, at least in part, on the assistance information. In some example, the one or more other nodes are nodes with a wireless connection to the first node, to each other, or a combination thereof.

At 1606, the first node configures the one or more other nodes with the determined one or more one-hop RLC channel PDBs.

As discussed above, the IAB donor node (e.g., the CU-CP) determines the one-hop RLC PDBs for the IAB network. The objective is to ensure that the end-to-end PDB of a QoS flow can be achieved by IAB-network.

According to certain aspects, the IAB donor node can determine the one-hop PDBs based on various factors. The factors may be associated with each QoS flow aggregated with the RLC channel. For example, the IAB donor node can determine the one-hop PDBs based on the end-to-end PDB, the number of hops for this QoS flow, link quality of intermediate IAB-nodes along the path of this QoS flow; buffer loading of intermediate IAB-nodes along the patent of this QoS flow.

According to certain aspects, the IAB donor node can determine the RLC PDB as a function (e.g., a minimum value) of delay upper bounds for this hop calculated for each QoS flow aggregated in this RLC channel. In an illustrative example, the IAB donor node may determine the one-hop RLC PDB as: $\min_i((PDB(i)-CN\_PDB)*S(i))$ over all QoS flows aggregated at this RLC channel, where the PDB(i) is the end-to-end PDB of the i-th flow; and S(i) is a scaling value based on factors such as number of hops, link quality, buffer loading, etc. In an example, S(i)=1/number_of_hop(i) (equally divided among hops). In another example, a weight may be used for the hop. For example, $w(i)=w/\Sigma_j w_j(i)$ (partition among hops based on weight), w is the weight of this hop, $w_j(i)$ is the weight of j-th hop of i-th QoS flow. The weight can be a function of link quality and/or buffer loading.

As discussed herein, the IAB donor node CU may be split into CU-CP and CU-UP with an E1 interface in-between.

The RLC PDB is determined by the CU-CP, however, the CU-UP may have more information on the user plane useful for determining the RLC PDBs. For example, the CU-UP may have information regarding radio link and buffer status of IAB-DUs, than CU-CP, which can be useful for the determination of RLC PDB. The CU-CP may have measurement reports (e.g., layer 3 reports) received from other nodes (e.g., a child UE and/or MT). The measurement report(s) may include reference signal received power (RSRP) measurements, signal-to-interference and noise ratio (SINR) measurements, and/or reference signal received quality (RSRP) measurements. The CU-UP may have radio quality assistance information reported from an IAB-DU for a DRB or RLC channel. For example, the radio quality assistance information may include an average channel quality indicator (CQI) value, an average number of hybrid automatic repeat request (HARQ) retransmissions, an average number of HARQ failures, downlink radio quality index, uplink radio quality index, downlink delay DU results, uplink delay results, buffer loading, and/or a desired buffer size, for the DRB or RLC channel.

According to certain aspects, the CU-CP uses the assistance information received from the CU-UP (e.g., in addition to information already available at the CU-CP) to determine the one-hop RLC PDBs.

According to certain aspects, the CU-UP may send all of the available assistance information to the CU-CP or only a portion (e.g., a subset) of the available assistance information.

According to certain aspects, the assistance information may be processed based on link quality and/or buffer loading to scale PDB partition among hops.

Figure 17:
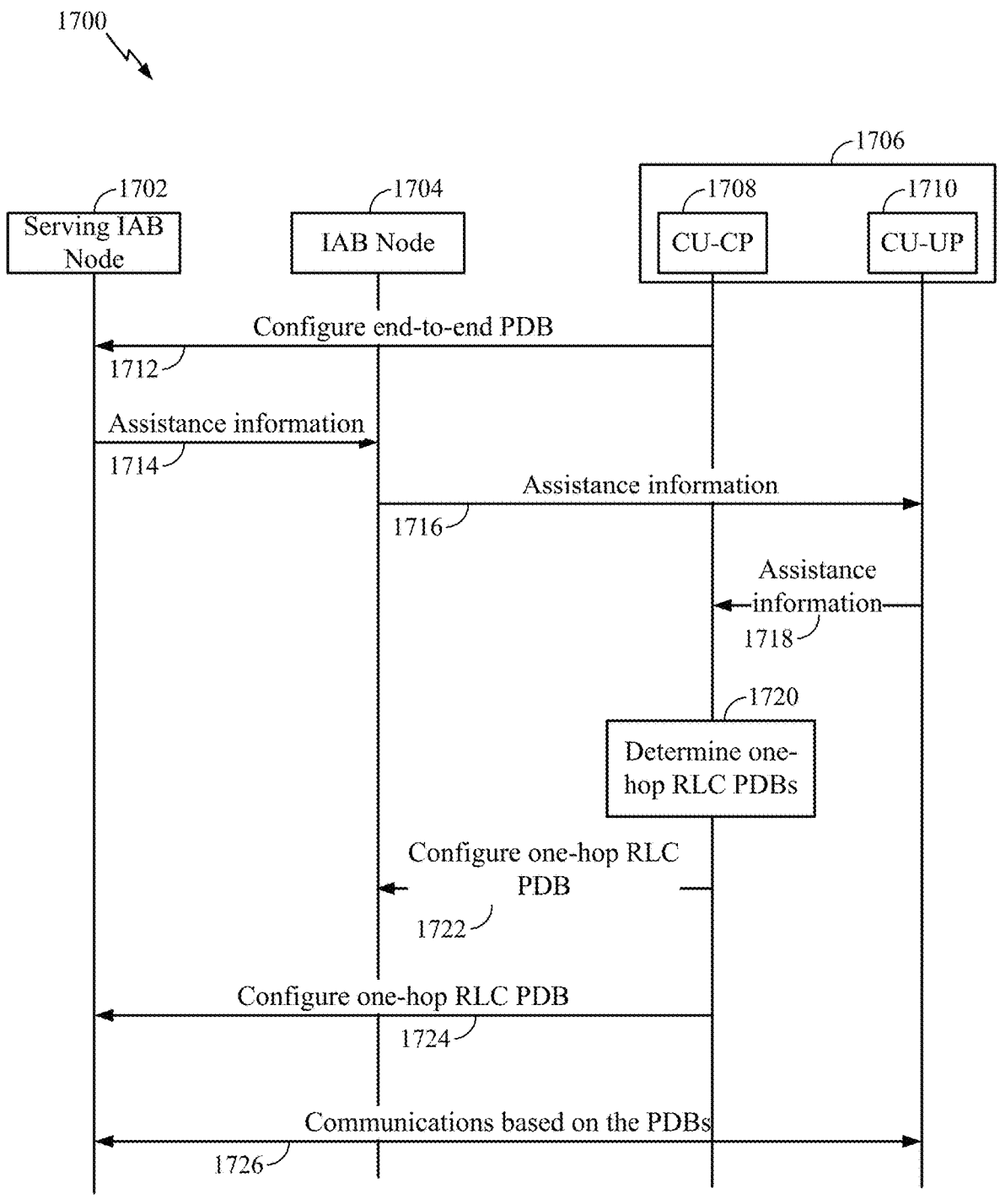
FIG. 17 is a call flow diagram illustrating example signaling for PDB determination in an IAB network with assistance information, in accordance with aspects of the present disclosure.

FIG. 17 is a call flow 1700 illustrating example PDB determination with assistance information, in accordance with aspects of the disclosure. As shown in FIG. 17, an IAB donor node 1706 (e.g., such as IAB donor node 604 illustrated in FIG. 9) may configure an end-to-end PDB at the serving IAB node 1702 (e.g., serving a UE, not shown), at 1712. At 1714 and 1716, the serving IAB node 1702 and IAB node 1704, respectively, may send assistance information to the CU-UP 1710 of the IAB donor node 1706. At 1718, the CU-UP 1710 may provide all or some of the assistance information to the CU-CP 1708 of the IAB donor node 1706, via the E1 interface. At 1720, the CU-CP 1708 may determine one-hop RLC PDBs using the assistance information. At 1722 and 1724, the IAB donor node 1706 configures the determined one-hop RLC PDBs at the serving IAB node 1702 and the IAB node 1704. At 1724, the IAB nodes may communicate based on the configured PDBs.

Figure 19:
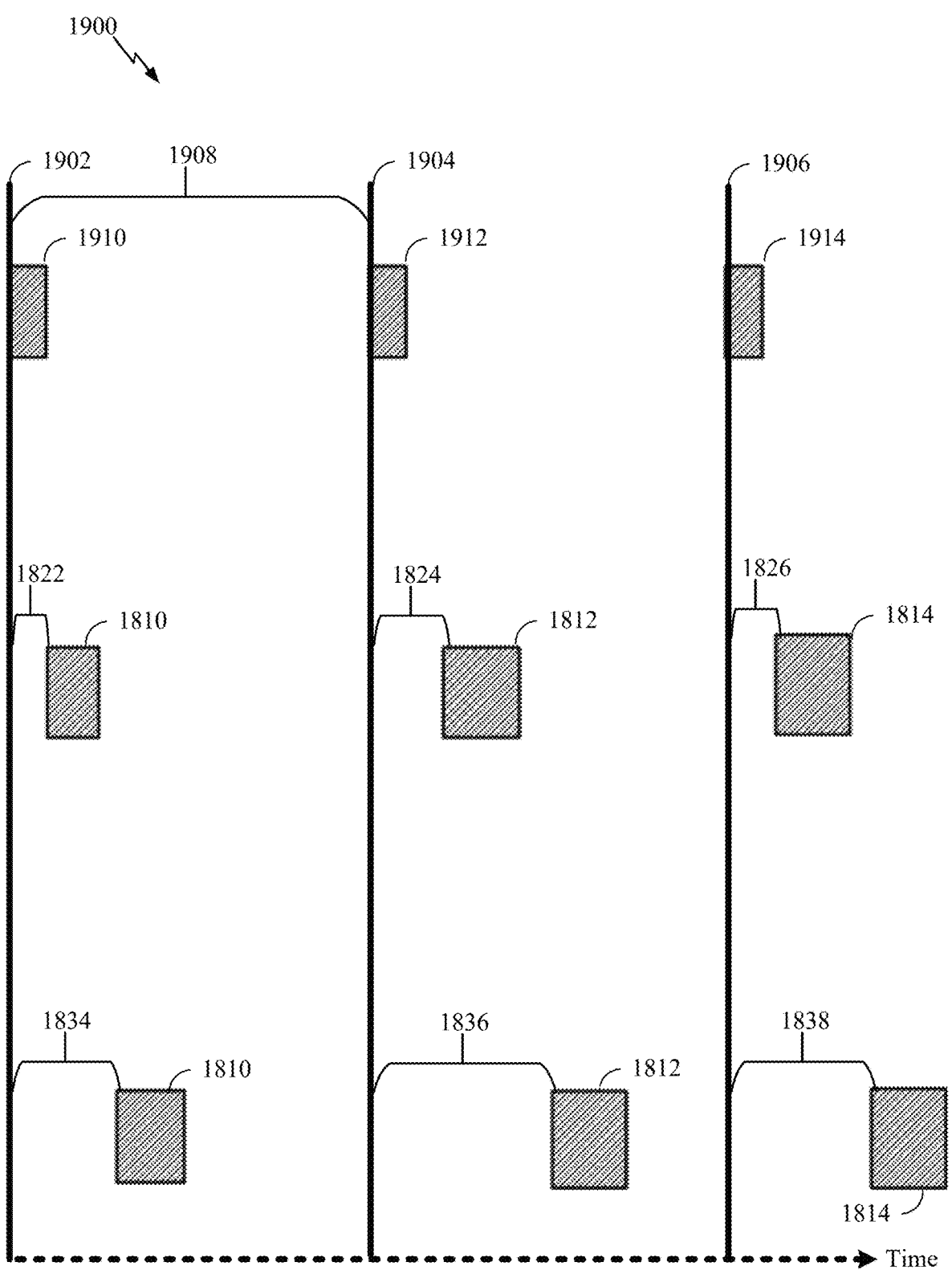
FIG. 19 illustrates an example TSC flow of a UE, in accordance with certain aspects of the present disclosure.

Example Signaling Enhancements for Supporting Time Sensitive Communications (TSC) in an Integrated Access and Backhaul (IAB) Node The arrival time of the flows at the hops in the IAB may be unknown. For example, the periodicity and arrival time may known at the IAB donor node (e.g., at the CU-UP), but unknown at the subsequent hops. FIG. 19 illustrates an example TSC flow 1900 of a UE (e.g., the UE 1824 of FIG. 18). As shown, at 1902, an IAB donor node may receive a packet 1910 scheduled for a TSC flow to the UE via IAB intermediate nodes. However, the IAB donor node may not know the latency 1922 experienced before the packet 1910 is received at the next-hop IAB node. In some cases, the arrival time (e.g., the reception of packet 1910 after latency 1922) may be based on arrival time(s) of previous hop(s) and/or HARQ status (e.g., whether the packet was initially successfully received at the previous hop or was retransmitted). Similarly, the IAB donor node may also not know the latency 1934 experienced before the packet 1910 is received by the next-hop (e.g., another intermediate IAB node or the UE). Similarly, after the periodicity 1908, another packet 1912 may be received by the IAB donor node to forward, at 1904 and after another packet 1914, at 1906. The IAB donor node may not know the latencies 1924, 1936, 1926, and 1938 associated with next hops for the packets 1912 and 1914, respectively.

A component of success for a QoS flow (or TSC flow or DRB) is to ensure the end-to-end PDB. As discussed above, the CU determines the PDB(s) of BH RLC channels for each IAB node such that end-to-end PDBs of QoS flows can be guaranteed. The determination of PDB(s) of BH RLC channels may be based on end-to-end PDBs of QoS flows aggregated into each particular RLC channel, topology information (e.g., number of hops), and/or information of each IAB node (e.g. average link quality and/or buffer loading at each IAB node). However, this centralized approach partitions an end-to-end PDB into multiple one-hop PDBs over multiple hops along the routing path when a packet may spend more (or less) time than the target one-hop PDB at a particular hop due to, for example, changes of channel conditions or traffic loading. Therefore, a dynamic approach to determining a PDB may be beneficial.

As discussed above, an integrated access and backhaul (IAB) donor node, such as the IAB donor node 604 illustrated in FIG. 9, may determine packet delay budgets (PDBs) for the radio link control (RLC) channels in an IAB network. The IAB donor node may configure the PDBs for uplink and/or downlink at the IAB nodes (e.g., intermediate IAB nodes) in the IAB network. The PDBs for the RLC channels may be a one-hop PDB for each of the RLC channels. The RLC channels may include backhaul (BH) RLC channels between intermediate nodes and access RLC channels between serving IAB nodes and user equipment (UE). An end-to-end PDB may also be configured, for example, at the serving IAB nodes. The IAB node may configure the one-hop PDBs to ensure that the end-to-end PDBs are achieved.

Aspects of the present disclosure provide techniques for signaling enhancements for supporting time sensitive communication (TSC) traffic in an integrated access and backhaul (IAB) network. Such signaling enhancements may include assistance information for an IAB node to schedule TSC traffic.

Figure 20:
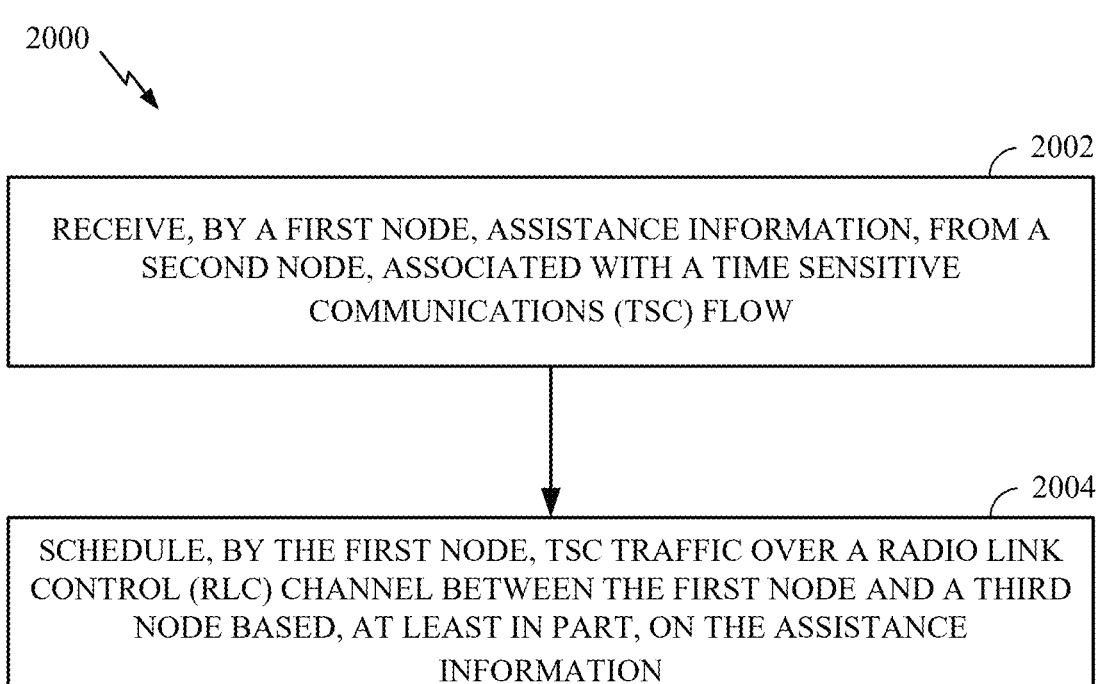
FIGS. 20-21 are flow diagrams illustrating example operations for wireless communication by a first node, in accordance with certain aspects of the present disclosure.

FIG. 20 is a flow diagram illustrating example operations 2000 for wireless communication, in accordance with certain aspects of the present disclosure. The operations 2000 may be performed, for example, by a first node. The first node may be an intermediate IAB node, a serving IAB node, or a UE (e.g., such as a BS 110a or a UE 200a in the wireless communication network 100). The operations 2000 may be implemented as software components that are executed and run on one or more processors (e.g., controller/processor 240 or controller/processor 280 of FIG. 2). Further, the transmission and reception of signals by the first node in operations 2000 may be enabled, for example, by one or more antennas (e.g., antennas 234 and/or antennas 252 of FIG. 2). In certain aspects, the transmission and/or reception of signals by the first node may be implemented via a bus interface of one or more processors (e.g., controller/processor 280) obtaining and/or outputting signals.

The operations 2000 may begin, at 2002, by receiving assistance information, from a second node, associated with a TSC flow. For example, the assistance information may be received from a central unit (CU) of an IAB donor node. As will be described in more detail below, the assistance information may include a periodicity of the TSC traffic, a burst arrival time of the TSC traffic, target burst arrival times at various nodes, and/or a full of subset of quality of QoS parameters associated with the TSC flow.

At 2004, the first node schedules TSC traffic over a RLC channel between the first node and a third node based, at least in part, on the assistance information. For example, the first node may schedule communications in accordance with the assistance information and/or based on a PDB associated with the TSC flow.

Figure 21:
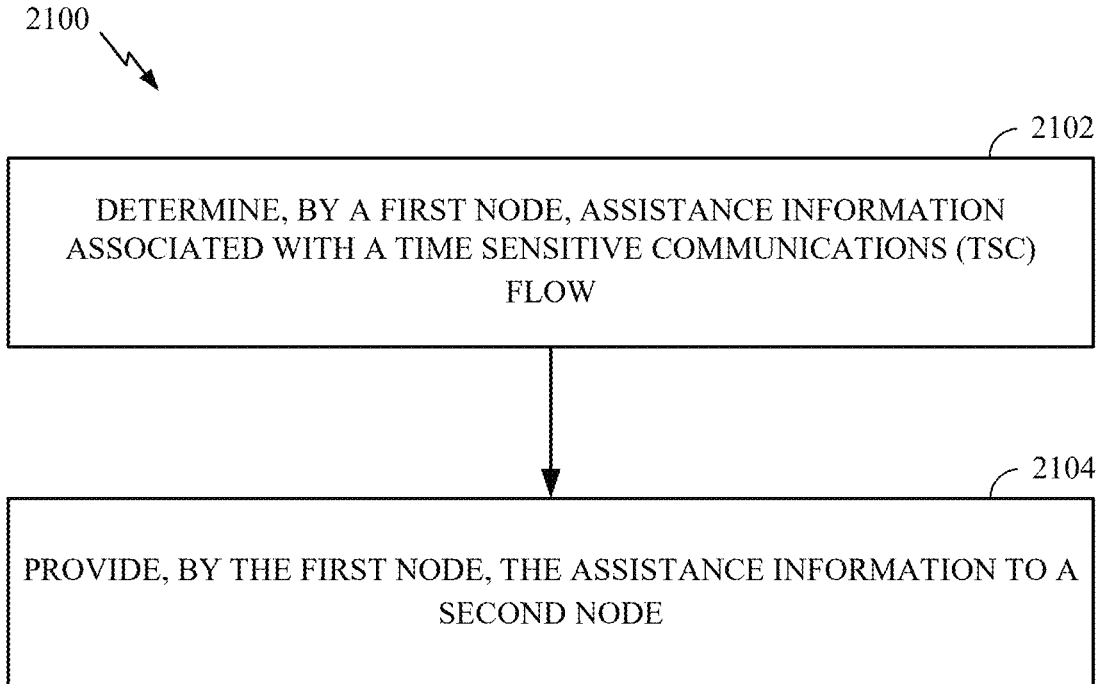

FIG. 21 is a flow diagram illustrating example operations 2100 for wireless communication, in accordance with certain aspects of the present disclosure. The operations 2100 may be performed, for example, by a first node. The first node may be a CU of an IAB donor node (e.g., such as a BS 110*a* in the wireless communication network 100). The operations 2100 may be implemented as software components that are executed and run on one or more processors (e.g., controller/processor 240 of FIG. 2). Further, the transmission and reception of signals by the first node in operations 2100 may be enabled, for example, by one or more antennas (e.g., antennas 234 of FIG. 2). In certain aspects, the transmission and/or reception of signals by the first node may be implemented via a bus interface of one or more processors (e.g., controller/processor 240) obtaining and/or outputting signals.

The operations 2100 may begin, at 2102, by determining assistance information associated with a TSC flow. For example, the assistance information may be a periodicity of the TSC traffic, a burst arrival time of the TSC traffic, target burst arrival times at various nodes, and/or a full of subset of quality of QoS parameters associated with the TSC flow. In some example, at least some of the information of the assistance information may be received at the IAB donor node from a core network.

At 2104, the first node provides the assistance information to a second node. For example, this may enable the second node to schedule TSC traffic with a third node.

Figure 22:
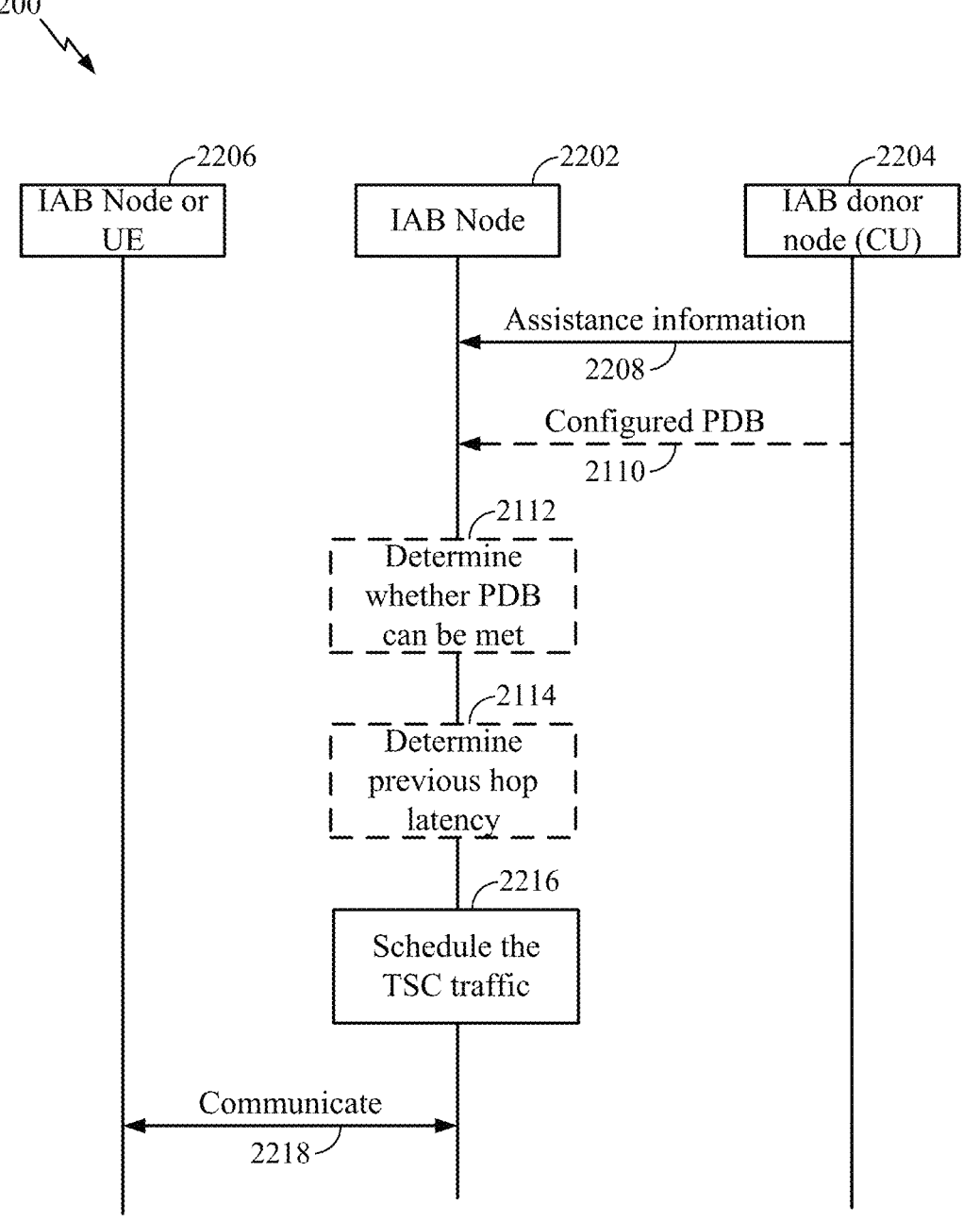
FIG. 22 is a call flow diagram illustrating example signaling for assistance information signaling for TSC traffic in an IAB network, in accordance with aspects of the present disclosure.

FIG. 22 is a call flow diagram 2200 illustrating example signaling enhancements for supporting TSC traffic in an IAB network. In certain aspects, the operations 2000 of FIG. 20 and the operations 2100 of FIG. 21 may be understood in the deployment depicted by the call flow diagram 2200. As shown, an IAB node 2202, an IAB donor node 2204, and another IAB node or UE 2206 may communicate within an IAB network.

According to certain aspects, information related to a TSC flow can be provided by an IAB donor node CU to an IAB node DU. For example, the IAB donor node CU may provide information for a TSC quality of service (QOS) flow that is aggregated into a BH RLC channel of an IAB node and/or a QoS flow aggregated in an access RLC channel of a UE. The information may be provided via an F1 application protocol (AP) interface and/or a radio resource control (RRC) message. For example, as illustrated in FIG. 22, at 2208, the IAB node 2202 receives, from the IAB donor node 2204, assistance information associated with a TSC flow.

According to certain aspects, the assistance information may include a periodicity of the TSC traffic, a burst arrival time of the TSC traffic (e.g., an ingress of downlink TSC traffic at a CU or an egress of uplink TSC traffic at a UE), a target burst arrival time at the first node (e.g., an ingress of downlink TSC traffic at a mobile terminal (MT) of an IAB node or an ingress of uplink TSC traffic at a DU of an IAB node), and/or a target burst arrival time at a next hop node (e.g., an ingress of downlink TSC traffic at a MT of the child node or an ingress of uplink TSC traffic at a DU of the parent node).

According to certain aspects, the node provides a full set or a partial set (e.g., subset) of quality of QOS parameters associated with the TSC flow. In some cases, an end-to-end PDB of the TSC QOS flow (e.g., the PDB between the CU and the UE) is provided to an IAB node DU at 2210.

A TSC QOS flow may be configured with a delay critical guaranteed bit rate (GBR) type. For a delay critical GBR type, a packet exceeding end-to-end PDB may be regarded as a loss. Further, for a BH RLC channel (e.g., in Rel-16), only one-hop BHRLC_PDB may be provided to an IAB-node.

The IAB node may discard a packet of the TSC QOS flow if the delay of the packet exceeds the end-to-end PDB. For example, as illustrated at 2212, the IAB node 2202 determines if the PDB can be met.

As shown, the IAB node 2202 may schedule TSC traffic over a RLC channel between the IAB node 2202 and the IAB node or UE 2206 based, at least in part, on the assistance information received at 2208.

In some cases, the IAB node 2202 may schedule the TSC traffic in a variety of ways. For example, the IAB node 2202 may schedule the TSC traffic by determining periodic resources allocated for the TSC traffic via downlink semi persistent scheduling (SPS) and/or an uplink configured grant (CG), such as a type-2 configured grant, based on the target burst arrival time at the IAB node 2202 and the periodicity of the TSC traffic.

As another example, the IAB node 2202 may schedule the TSC traffic by coordinating soft resources with the IAB node or UE 2206 such that the resources are available for the TSC traffic. For example, the IAB node 2202 may coordinate based on the target burst arrival time at the IAB node 2202, the target burst arrival time at a child node (e.g., the IAB node or UE), the periodicity of the TSC traffic, or a combination thereof.

As another example, the IAB node 2202 may schedule the TSC traffic by dynamically determining a one-hop latency budget for the TSC traffic on the RLC channel, based on a reception time of a packet and the target burst arrival time at the nest hope node (e.g., the IAB node or UE).

As yet another example, the IAB node 2202 may schedule the TSC traffic by dynamically determining a one-hop latency budget for a packet on the RLC channel, based on at least one of an end-to-end PDB associated with the TSC flow and experienced latency associated with the packet at previous hops. In this case, the IAB node 2202 may determine, as shown at 2214, the experienced latency at previous hops based on the burst arrival time, the periodicity, and a reception time of the packet.

In some examples, the target burst arrival time at an IAB node can be determined by the donor CU based on its knowledge: a network topology, link quality, and/or traffic loading at each node of the network.

As shown at 2218, the IAB node 2202 communicates with the third IAB node or UE 2206 based on the scheduled TSC traffic.

Figure 23:
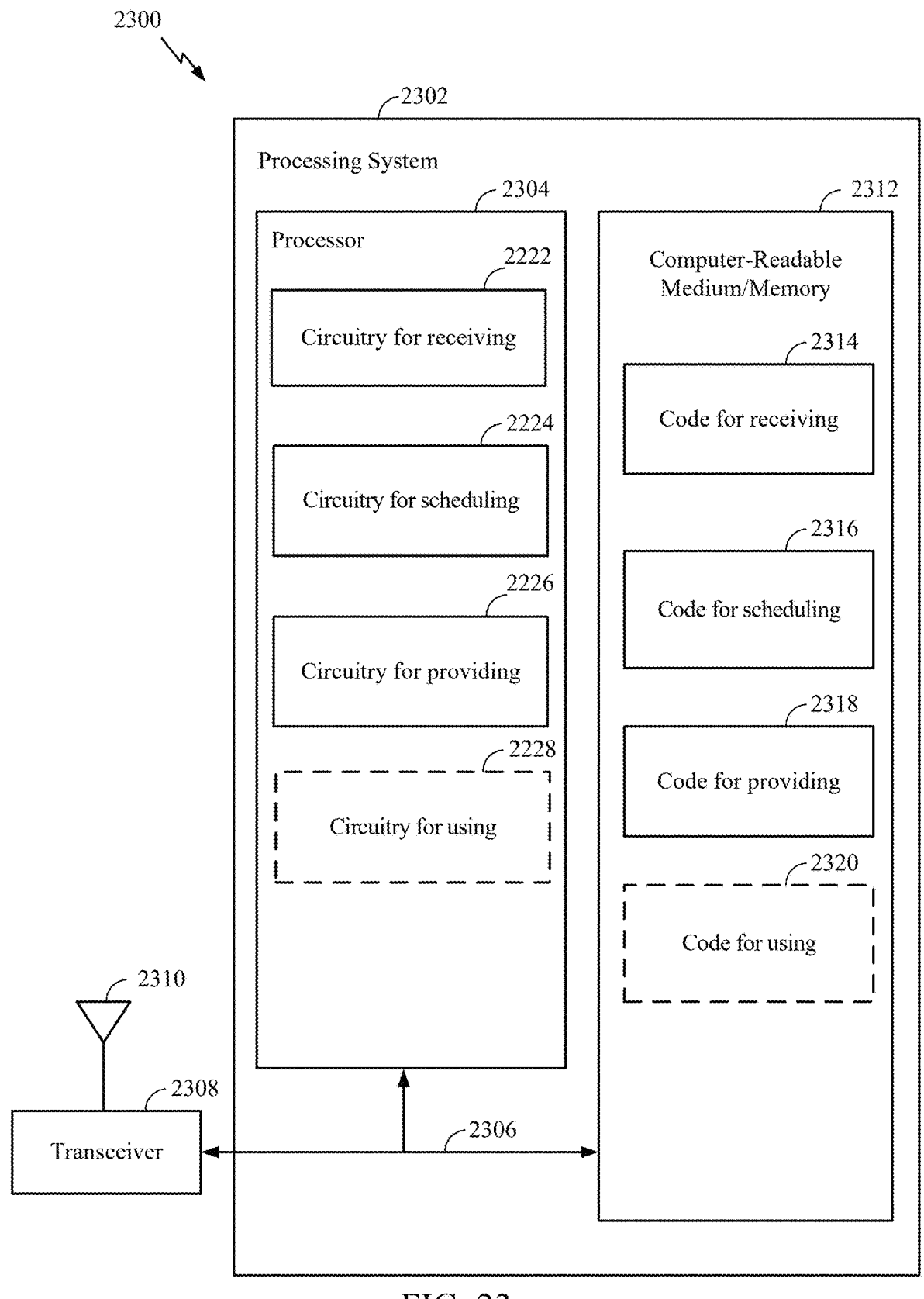
FIG. 23 illustrates a communications device that may include various components configured to perform operations for the techniques disclosed herein in accordance with aspects of the present disclosure.

FIG. 23 illustrates a communications device 2300 that may include various components (e.g., corresponding to means-plus-function components) configured to perform operations for the techniques disclosed herein, such as the operations illustrated in FIG. 10, FIG. 12, FIG. 14, FIG. 16, and/or FIG. 20. The communications device 2300 includes a processing system 2302 coupled to a transceiver 2308 (e.g., a transmitter and/or a receiver). The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 10, FIG. 12, FIG. 14, FIG. 16, and/or FIG. 20, or other operations for performing the various techniques discussed herein for determining and defining PDB for an RLC channel between two nodes. In certain aspects, computer-readable medium/memory 2312 stores code 2314 for receiving; code 2316 for scheduling; code 2318 for providing; and/or code 2320 for using, in accordance with aspects of the disclosure. In certain aspects, the processor 2304 has circuitry configured to implement the code stored in the computer-readable medium/memory 2312. The processor 2304 includes circuitry 2322 for receiving; circuitry 2324 for scheduling; circuitry 2326 for providing; and/or circuitry 2328 for using, in accordance with aspects of the disclosure.

Means for receiving may include a receiver and/or an antenna(s) 234 of the BS 110*a* or a receiver and/or antenna(s) 252 of the UE 120*a* illustrated in FIG. 2 and/or circuitry 2322 of the communication device 2300 in FIG. 23. Means for scheduling may include a transmitter and/or an antenna(s) 234 or the BS 110*a* or the transmitter unit 254 and/or antenna(s) 252 of the UE 120*a* illustrated in FIG. 2 and/or circuitry 2324 of the communication device 2300 in FIG. 23. Means for providing may include a transmitter and/or an antenna(s) 234 or the BS 110*a* or the transmitter unit 254 and/or antenna(s) 252 of the UE 120*a* illustrated in FIG. 2 and/or circuitry 2326 of the communication device 2300 in FIG. 23. Means for using may include a transmitter and/or an antenna(s) 234 or the BS 110*a* or the transmitter unit 254 and/or antenna(s) 252 of the UE 120*a* illustrated in FIG. 2 and/or circuitry 2328 of the communication device 2300 in FIG. 23.

Figure 24:
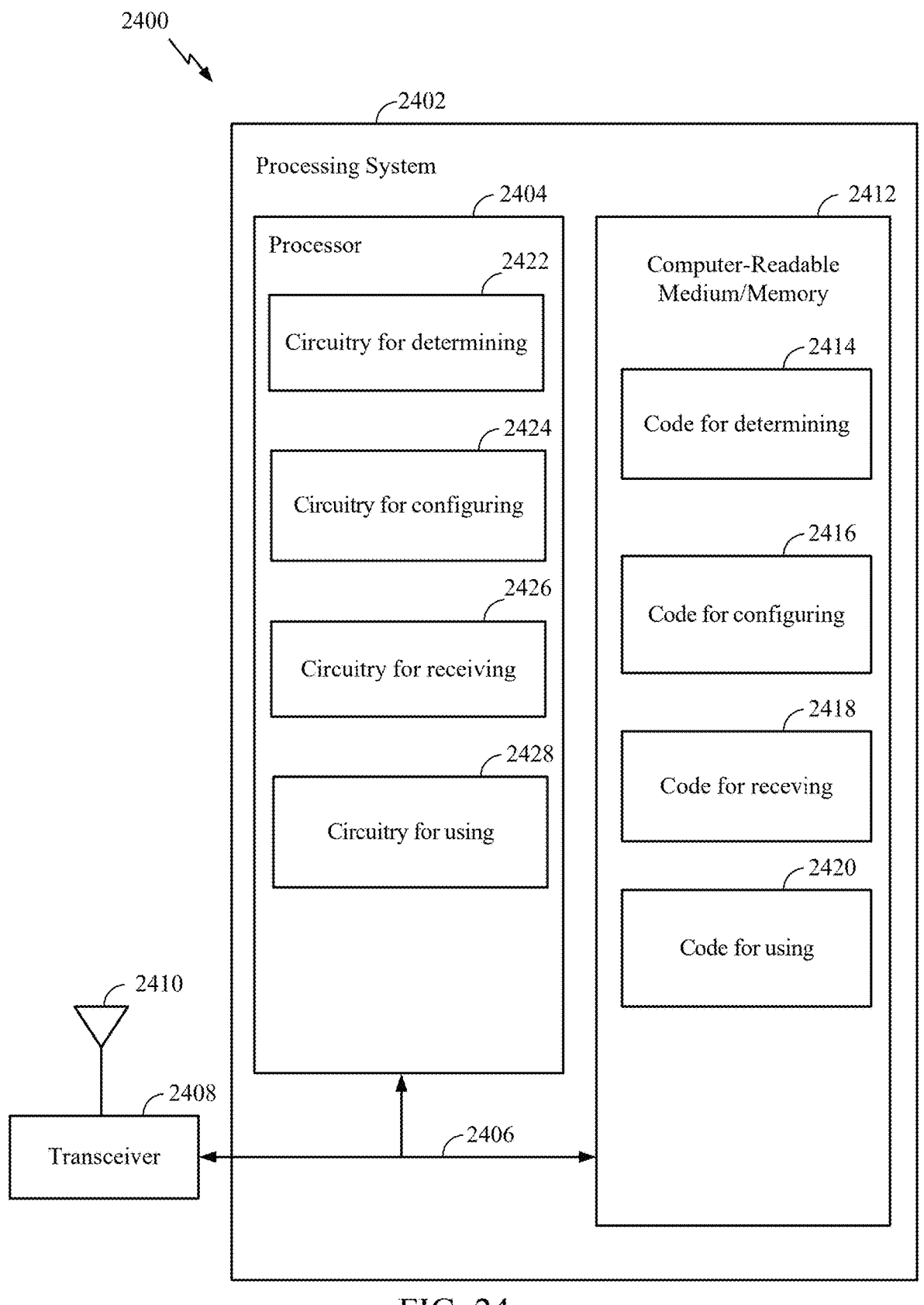
FIG. 24 illustrates a communications device that may include various components configured to perform operations for the techniques disclosed herein in accordance with aspects of the present disclosure.

FIG. 24 illustrates a communications device 2400 that may include various components (e.g., corresponding to means-plus-function components) configured to perform operations for the techniques disclosed herein, such as the operations illustrated in FIG. 11, FIG. 13, and/or FIG. 21. The communications device 2400 includes a processing system 2402 coupled to a transceiver 2408 (e.g., a transmitter and/or a receiver). The transceiver 2408 is configured to transmit and receive signals for the communications device 2400 via an antenna 2410, such as the various signals as described herein. The processing system 2402 may be configured to perform processing functions for the communications device 2400, including processing signals received and/or to be transmitted by the communications device 2400.

The processing system 2402 includes a processor 2404 coupled to a computer-readable medium/memory 2412 via a bus 2406. In certain aspects, the computer-readable medium/memory 2412 is configured to store instructions (e.g., computer-executable code) that when executed by the processor 2404, cause the processor 2404 to perform the operations illustrated in FIG. 11, FIG. 13, and/or FIG. 21, or other operations for performing the various techniques discussed herein for determining a PDB for an RLC channel and configuring a node with the determined PDB. In certain aspects, computer-readable medium/memory 2412 stores code 2414 for determining; code 2416 for configuring; code 2418 for receiving; and/or code 2420 for using, in accordance with aspects of the disclosure. In certain aspects, the processor 2404 has circuitry configured to implement the code stored in the computer-readable medium/memory 2412. The processor 2404 includes circuitry 2422 for determining; circuitry 2424 for configuring; circuitry 2426 for receiving; and/or circuitry 2428 for using, in accordance with aspects of the disclosure.

Means for determining may include a processing system, which may include one or more processors, such as the transmit processor 220, the TX MIMO processor 240, the receive processor 248, and/or the controller/processor 240 of the BS 110*a* or the receive processor 258, the transmit processor 264, the TX MIMO processor 266, and/or the controller/processor 280 of the UE 120*a* illustrated in FIG. 2, and/or the processing system 2402 and the circuitry 2422 of the communication device 2400 in FIG. 24. Means for configuring may include a transmitter and/or an antenna(s) 234 or the BS 110*a* or the transmitter unit 254 and/or antenna(s) 252 of the UE 120*a* illustrated in FIG. 2 and/or circuitry 2424 of the communication device 2400 in FIG. 24. Means for receiving may include a receiver and/or an antenna(s) 234 of the BS 110*a* or a receiver and/or antenna(s) 252 of the UE 120*a* illustrated in FIG. 2 and/or circuitry 2426 of the communication device 2400 in FIG. 24. Means for using may include a transmitter and/or an antenna(s) 234 or the BS 110*a* or the transmitter unit 254 and/or antenna(s) 252 of the UE 120*a* illustrated in FIG. 2 and/or circuitry 2428 of the communication device 2400 in FIG. 24.

Example Aspects

Clause 1: A method for wireless communication by a first node, comprising: receiving an indication of a one-hop radio link control (RLC) channel packet delay budget (PDB) for an RLC channel between the first node and a second node, wherein the PDB is across a full protocol stack or a partial protocol stack; and scheduling communications with the second node based on the RLC channel PDB.

Clause 2: The method of Clause 1, wherein the indication of the one-hop RLC channel PDB is semi-statically configured by a central unit.

Clause 3: The method of any one of Clauses 1 or 2, wherein the first node is an integrated access and backhaul (IAB) node and the second node is a child IAB node or a user equipment (UE) of the first node, and wherein the protocol stack is between a distributed unit (DU) of the first node and a mobile terminal (MT) of the second node.

Clause 4: The method of any one of Clauses 1 through 3, wherein the one-hop RLC channel PDB is across the full protocol stack between backhaul adaption protocol (BAP) layers of the first node and the second node.

Clause 5: The method of Clause 4, wherein: the one-hop RLC channel PDB is between an ingress of a packet at a BAP layer at the first node and an egress of the packet at a BAP layer at the second node for downlink (DL); and the one-hop RLC channel PDB is between an ingress of a packet at the BAP layer at the second node and an egress of the packet at the BAP layer at the first node for uplink (UL).

Clause 6: The method of any one of Clauses 1 through 5, wherein the one-hop RLC channel PDB is across the partial protocol stack between an ingress of a packet at a backhaul adaption protocol (BAP) layer at a transmission node and a reception of an acknowledgment for the packet at the transmission node.

Clause 7: The method of Clause 6, wherein: the one-hop RLC channel PDB is between an ingress of a downlink (DL) packet at the BAP layer at the first node and reception of a hybrid automatic repeat request (HARQ) acknowledgment for the DL packet at the first node for DL; and the one-hop RLC channel PDB is between an ingress of an uplink (UL) packet at the BAP layer at the second node and reception of a new grant for a same HARQ process at the second node for UL.

Clause 8: The method of any one of Clauses 1 through 7, wherein the one-hop RLC channel PDB is across the partial protocol stack between a first transmission of a packet over-the-air by a transmission node and a reception of an acknowledgment for the packet at the transmission node.

Clause 9: The method of Clause 8, wherein: the one-hop RLC channel PDB is between transmission of a downlink (DL) packet at the first node and reception of a hybrid automatic repeat request (HARQ) acknowledgment for the DL packet at the first node for DL; the one-hop RLC channel PDB is between transmission of an uplink (UL) packet at the second node and reception of a new grant for a same HARQ process at the second node for UL.

Clause 10: A method for wireless communication by a first node, comprising: determining a one-hop radio link control (RLC) channel packet delay budget (PDB) for an RLC channel between nodes, wherein the PDB is across a full protocol stack or a partial protocol stack; and configuring a second node with the determined RLC channel PDB.

Clause 11: The method of Clause 10, wherein configuring the second node comprises semi-statically configuring the second node with the determined one-hop RLC channel PDB.

Clause 12: The method of any one of Clauses 10 or 11, wherein: the first node is an integrated access and backhaul (IAB) donor node including a central unit (CU) and a distributed unit (DU); the second node is an IAB node including a DU and a mobile terminal (MT); a third node is a child IAB node of the second node or is a user equipment (UE); and the protocol stack is between the DU of the second node and a MT of the third node.

Clause 13. The method of any one of Clauses 10 through 12, wherein the one-hop RLC channel PDB is across the full protocol stack between backhaul adaption protocol (BAP) layers of the second node and a third node.

Clause 14: The method of Clause 13, wherein: the one-hop RLC channel PDB is between an ingress of a packet at a BAP layer at the second node and an egress of the packet at a BAP layer at the third node for downlink (DL); and the one-hop RLC channel PDB is between an ingress of a packet at the BAP layer at the third node and an egress of the packet at the BAP layer at the second node for uplink (UL).

Clause 15: The method of any one of Clauses 10 through 14, wherein the one-hop RLC channel PDB is across the partial protocol stack between an ingress of a packet at a backhaul adaption protocol (BAP) layer at a transmission node and a reception of an acknowledgment for the packet at the transmission node.

Clause 16: The method of Clause 15, wherein: the one-hop RLC channel PDB is between an ingress of a downlink (DL) packet at the BAP layer at the second node and reception of a hybrid automatic repeat request (HARQ) acknowledgment for the DL packet at the second node for DL; and the one-hop RLC channel PDB is between an ingress of an uplink (UL) packet at the BAP layer at a third node and reception of a new grant for a same HARQ process at the third node for UL.

Clause 17: The method of any one of Clauses 10 through 16, wherein the one-hop RLC channel PDB is across the partial protocol stack between a first transmission of a packet over-the-air by a transmission node and a reception of an acknowledgment for the packet at the transmission node.

Clause 18: The method of Clause 17, wherein: the one-hop RLC channel PDB is between transmission of a downlink (DL) packet at the second node and reception of a hybrid automatic repeat request (HARQ) acknowledgment for the DL packet at the second node for DL; and the one-hop RLC channel PDB is between transmission of an uplink (UL) packet at a third node and reception of a new grant for a same HARQ process at the third node for UL.

Clause 19: A method for wireless communication by a first node, comprising: providing a stack processing time capability of the first node to a second node; and receiving scheduling for a radio link control (RLC) channel, a one-hop RLC channel packet delay budget (PDB) for an RLC channel, or both, from the second node.

Clause 20: The method of Clause 19, wherein the stack processing time capability of the first node is provided via a radio resource control (RRC) message or an F1 interface message when the second node is a central unit.

Clause 21: The method of any one of Clauses 19 or 20, wherein the stack processing time capability of the first node is provided directly to the second node via a medium access control (MAC) control element (CE) when the second node is a parent node of the first node.

Clause 22: The method of any one of Clauses 19 through 21, wherein the stack processing time capability of the first node is provided indirectly to the second node via a central unit by a radio resource control (RRC) message or an F1 interface message when the second node is a parent node of the first node.

Clause 23: The method of any one of Clauses 19 through 22, wherein the receiving comprises receiving the one-hop RLC channel PDB for the RLC channel when the second node is a central unit.

Clause 24: The method of any one of Clauses 19 through 23, wherein the receiving comprises receiving scheduling for the RLC channel when the second node is a parent node of the first node.

Clause 25: The method of any one of Clauses 19 through 24, wherein the one-hop RLC channel PDB is associated with at least one of: a quality-of-service (QOS) flow for an access RLC channel, a data radio bearer (DRB) for the access RLC channel, or a backhaul RLC channel that aggregates one or more QoS flows.

Clause 26: The method of any one of Clauses 19 through 25, wherein the RLC channel is between the first node and the second node when the second node is a parent node of the first node, and wherein the RLC channel is between the first node and a third node when the second node is a central unit (CU) of an integrated access and backhaul (IAB) donor node.

Clause 27: A method for wireless communication by a first node, comprising: receiving a stack processing time capability of a second node; and configuring the second node with a one-hop radio link control (RLC) channel packet delay budget (PDB) for an RLC channel, based on the stack processing time capability of the second node.

Clause 28: The method of Clause 27, wherein the first node comprises a node with a wired connection to a core network, and wherein the second node comprises a node with a wireless connection to the first node.

Clause 29: The method of any one of Clauses 27 or 28, further comprising: using the stack processing time capability of the second node to configure the second node with the one-hop RLC channel PDB when the stack processing time is comparable to over-the-air transmission time.

Clause 30: The method of any one of Clauses 27 through 29, wherein the stack processing time capability of the second node is received via a radio resource control (RRC) message or an F1 interface message.

Clause 31: The method of any one of Clauses 27 through 30, wherein the one-hop RLC channel PDB is associated with at least one of: a quality-of-service (QOS) flow for an access RLC channel, a data radio bearer (DRB) for the access RLC channel, or a backhaul RLC channel that aggregates one or more QoS flows.

Clause 32: A method for wireless communication by a first node, comprising: receiving a stack processing time capability of a second node; and scheduling the second node for a radio link control (RLC) channel based on the stack processing time capability of the second node.

Clause 33: The method of Clause 32, further comprising: providing a stack processing time capability of the first node to a third node, wherein the third node is either a control unit or a parent node of the first node.

Clause 34: The method of any one of Clauses 32 or 33, wherein the receiving comprises receiving the stack processing time capability of the second node directly from the second node via a medium access control (MAC) control element (CE).

Clause 35: The method of any one of Clauses 32 through 34, wherein the receiving comprises receiving the stack processing time capability of the second node indirectly from the second node via a central unit by a radio resource control (RRC) message or an F1 interface message.

Clause 36: The method of any one of Clauses 32 through 35, further comprising: using the stack processing time capability of the second node, a stack processing time of the first node, or both, to determine over-the-air latency bounds for the RLC channel based on a one-hop RLC channel PDB indicated by a central unit.

Clause 37: A method for wireless communication by a first node, comprising: obtaining assistance information for determining one or more one-hop radio link control (RLC) channel packet delay budgets (PDBs) for one or more other nodes; determining the one or more one-hop RLC channel PDBs for the one or more other nodes based, at least in part, on the assistance information; and configuring the one or more other nodes with the determined one or more one-hop RLC channel PDBs.

Clause 38: The method of Clause 37, wherein the assistance information is received at a control-unit control plane (CU-CP) from a CU user plane (CU-UP).

Clause 39: The method of any one of Clauses 37 or 38, wherein the first node comprises a node with a wired connection to a core network, and wherein the one or more other nodes comprise nodes with a wireless connection to the first node, to each other, or a combination thereof.

Clause 40: The method of any one of Clauses 37 through 39, wherein the assistance information is received via an E1 interface.

Clause 41: The method of any one of Clauses 37 through 40, wherein the assistance information includes user plane information forwarded from one or more distributed units (DUs) including, from each of the one or more other nodes, wherein the assistance information is associated with a data radio bearer (DRB), a RLC channel, or both.

Clause 42: The method of any one of Clause 41, wherein the assistance information includes average channel quality indicator (CQI), average number hybrid automatic repeat request (HARQ) retransmissions, average HARQ failure, downlink radio quality index, uplink radio quality index, downlink delay, uplink delay, buffer loading, a desired buffer size, or a combination thereof.

Clause 43: The method of any one of Clauses 41 or 42, wherein the assistance information include a full set or a subset of the information from the one or more DUs, processed information, or a combination thereof.

Clause 44: The method of any one of Clauses 37 through 43, further comprising: receiving one or more layer 3 measurement reports from one or more of the nodes, wherein determining the one or more one-hop RLC channel PDBs is further based on the one or more measurement reports.

Clause 45: A method for wireless communication by a first node, comprising: receiving assistance information, from a second node, associated with a time sensitive communications (TSC) flow; and scheduling TSC traffic over a radio link control (RLC) channel between the first node and a third node based, at least in part, on the assistance information.

Clause 46: The method of Clause 45, wherein the assistance information comprises at least one of: a periodicity of the TSC traffic; a burst arrival time of the TSC traffic, comprising an ingress of downlink TSC traffic at a central unit (CU) or an egress of uplink TSC traffic at a user equipment (UE); a target burst arrival time at the first node comprising an ingress of downlink TSC traffic at a mobile terminal (MT) of the first node or an ingress of uplink TSC traffic at a distributed unit (DU) of the first node; a target burst arrival time at the third node comprising an ingress of downlink TSC traffic at a MT of the third node or an ingress of uplink TSC traffic at a DU of the third node; a full of subset of quality of service (QOS) parameters associated with the TSC flow; or a combination thereof.

Clause 47: The method of Clause 46, further comprising: receiving a configured end-to-end packet delay budget (PDB) for the TSC flow; and determining, based on the assistance information, whether the configured end-to-end PDB can be met for a packet; and discarding the packet when the configured end-to-end PDB cannot be met for the packet.

Clause 48: The method of any one of Clauses 46 or 47, wherein scheduling the TSC traffic based on the assistance information comprises determining periodic resources allocated for the TSC traffic via downlink semi persistent scheduling (SPS) or an uplink configured grant (CG), based on the target burst arrival time at the first node and the periodicity of the TSC traffic.

Clause 49: The method of any one of Clauses 46 through 48, wherein scheduling the TSC traffic based on the assistance information comprises coordinating soft resources with the third node such that the soft resources are available for the TSC traffic, based on the target burst arrival time at the first node, the target burst arrival time at the third node, the periodicity of the TSC traffic, or a combination thereof.

Clause 50: The method of any one of Clauses 46 through 49, wherein scheduling the TSC traffic based on the assistance information comprises dynamically determining a one-hop latency budget for the TSC traffic on the RLC channel, based on a reception time of a packet and the target burst arrival time at the third node.

Clause 51: The method of any one of clauses 46 through 50, wherein scheduling the TSC traffic based on the assistance information comprises dynamically determining a one-hop latency budget for a packet on the RLC channel, based on at least one of an end-to-end packet delay budget (PDB) associated with the TSC flow and experienced latency associated with the packet at previous hops.

Clause 52: The method of Clause 51, further comprising determining the experienced latency at previous hops based on the burst arrival time, the periodicity, and a reception time of the packet.

Clause 53: The method of any one of Clauses 45 through 52, wherein the first node is an integrated access and backhaul (IAB) node.

Clause 54: The method of Clause 53, wherein: the second node is a central unit (CU); and the third node is a UE, another IAB node, or a CU.

Clause 55: The method of Clause 54, wherein the assistance information is received via F1 application protocol (F1-AP) signaling or radio resource control (RRC) signaling.

Clause 56: The method of any one of Clauses 45 through 55, wherein: the TSC flow is associated with a radio link control (RLC) channel; and the assistance information is associated with a quality-of-service (QOS) flow or a data radio bearer (DRB).

Clause 57: A method for wireless communication by a first node, comprising: determining assistance information associated with a time sensitive communications (TSC) flow; and providing the assistance information to a second node.

Clause 58: The method of Clause 57, wherein: the first node is a central unit (CU); and the second node is an integrated access and backhaul (IAB) node.

Clause 59: The method of Clause 58, wherein the assistance information is provided via F1 application protocol (F1-AP) signaling or radio resource control (RRC) signaling.

Clause 60: The method of any one of Clauses 57 through 59, wherein the assistance information comprises at least one of: a periodicity of TSC traffic; a burst arrival time of the TSC traffic, comprising an ingress of downlink TSC traffic at the first node or an egress of uplink TSC traffic at a user equipment (UE); a target burst arrival time at the second node comprising an ingress of downlink TSC traffic at a mobile terminal (MT) of the second node or an ingress of uplink TSC traffic at a distributed unit (DU) of the second node; a target burst arrival time at a third node comprising an ingress of downlink TSC traffic at a MT of a third node or an ingress of uplink TSC traffic at a DU of the third node, wherein the third node is a next-hop node from the second node; a full of subset of quality of service (QOS) parameters associated with the TSC flow; or a combination thereof.

Clause 61: The method of Clause 60, further comprising determining, based on a network topology and link quality and traffic loading at each node in the network, at least one of: the target burst arrival time at the second node; or the target burst arrival time at the third node.

Clause 62: The method of any one of Clauses 57 through 61, wherein the TSC flow is associated with a radio link control (RLC) channel PDB is associated with a quality-of-service (QOS) flow or a data radio bearer (DRB).

Clause 63: An apparatus, comprising: a memory having executable instructions stored thereon; and a processor configured to execute the executable instructions to perform the operations of any one of Clauses 1 through 62.

Clause 64: An apparatus, comprising: means for performing the operations of any one of Clauses 1 through 62.

Clause 65: A computer-readable medium having instructions stored thereon which, when executed by a processor, causes the processor to perform the operations of any one of Clauses 1 through 62.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10, FIG. 11, FIG. 12, FIG. 13, and/or FIG. 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first node, comprising:

receiving an indication of a one-hop radio link control (RLC) channel packet delay budget (PDB) for an RLC channel between the first node and a second node, wherein the one-hop RLC channel PDB is across a full protocol stack between backhaul adaption protocol (BAP) layers of the first node and the second node and includes a processing time of a plurality of protocol layers of the first node, a processing time of a plurality of protocol layers of the second node, and over-the-air transmission time, wherein the one-hop RLC channel PDB for downlink (DL) is between an ingress of a first packet at a BAP layer at the first node and an egress of the first packet at a BAP layer at the second node, and wherein the one-hop RLC channel PDB for uplink (UL) is between an ingress of a second packet at the BAP layer at the second node and an egress of the second packet at the BAP layer at the first node; and scheduling communications with the second node based on the RLC channel PDB.

2. The method of claim 1, wherein the indication of the one-hop RLC channel PDB is semi-statically configured by a central unit.

3. The method of claim 1, wherein the first node is an integrated access and backhaul (IAB) node and the second node is a child IAB node or a user equipment (UE) of the first node, and wherein the full protocol stack is between a distributed unit (DU) of the first node and a mobile terminal (MT) of the second node.

4. The method of claim 1, wherein:

the indication of the one-hop RLC channel PDB comprises assistance information determining one or more one-hop RLC channel PDBs for one or more other nodes including the second node, and the method further comprises:

determining the one or more one-hop RLC channel PDBs for the one or more other nodes based, at least in part, on the assistance information; and configuring the one or more other nodes with the one or more one-hop RLC channel PDBs for the one or more other nodes including the second node.

5. The method of claim 4, wherein the assistance information is received at a control unit (CU) control plane (CP) (CU-CP) from a CU user plane (UP) (CU-UP).

6. The method of claim 4, wherein the first node comprises a node with a wired connection to a core network, and wherein the one or more other nodes comprise nodes with a wireless connection to the first node, to each other, or a combination thereof.

7. The method of claim 4, wherein the assistance information is received via an E1 interface.

8. The method of claim 4, wherein the assistance information includes user plane information forwarded from one or more distributed units (DUs) including, for each of the one or more other nodes, information associated with a data radio bearer (DRB), a RLC channel, or both.

9. The method of claim 8, wherein the assistance information further includes one or more of:

average channel quality indicator (CQI), average number hybrid automatic repeat request (HARQ) retransmissions, average HARQ failure, downlink radio quality index, uplink radio quality index, downlink delay, uplink delay, buffer loading, a desired buffer size, or a combination thereof, or a full set or a subset of the information from the one or more DUs, processed information, or a combination thereof.

10. The method of claim 4, further comprising:

receiving one or more layer 3 measurement reports from one or more of the one or more other nodes, wherein determining the one or more one-hop RLC channel PDBs is further based on the one or more layer 3 measurement reports.

11. An apparatus for wireless communication by a first node, comprising:

at least one memory having executable instructions stored thereon; and one or more processors configured to execute the executable instructions to cause the apparatus to:

receive an indication of a one-hop radio link control (RLC) channel packet delay budget (PDB) for an RLC channel between the first node and a second node, wherein the one-hop RLC channel PDB is across a full protocol stack between backhaul adaption protocol (BAP) layers of the first node and the second node and includes a processing time of a plurality of protocol layers of the first node, a processing time of a plurality of protocol layers of the second node, and over-the-air transmission time, wherein the one-hop RLC channel PDB for downlink (DL) is between an ingress of a first packet at a BAP layer at the first node and an egress of the first packet at a BAP layer at the second node, and wherein the one-hop RLC channel PDB for uplink (UL) is between an ingress of a second packet at the BAP layer at the second node and an egress of the second packet at the BAP layer at the first node; and schedule communications with the second node based on the one-hop RLC channel PDB.

* * * * *